United States Patent
Ishigaki et al.

(10) Patent No.: US 9,647,544 B2
(45) Date of Patent: May 9, 2017

(54) MAGNETIC COMPONENT, POWER CONVERTER AND POWER SUPPLY SYSTEM

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Masanori Ishigaki, Nagakute (JP); Shuji Tomura, Nagoya (JP); Takaji Umeno, Nisshin (JP); Masaki Okamura, Toyota (JP); Daigo Nobe, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

(*) Notice: Subject to any disclaimer, the term of this patent is extended or adjusted under 35 U.S.C. 154(b) by 361 days.

(21) Appl. No.: 14/382,397

(22) PCT Filed: Mar. 18, 2013

(86) PCT No.: PCT/JP2013/001828
§ 371 (c)(1),
(2) Date: Sep. 2, 2014

(87) PCT Pub. No.: WO2013/140780
PCT Pub. Date: Sep. 26, 2013

(65) Prior Publication Data
US 2015/0084422 A1 Mar. 26, 2015

(30) Foreign Application Priority Data
Mar. 19, 2012 (JP) ................. 2012-061635

(51) Int. Cl.
*H02M 3/158* (2006.01)
*H01F 27/38* (2006.01)
(Continued)

(52) U.S. Cl.
CPC ............ *H02M 3/158* (2013.01); *H01F 27/38* (2013.01); *H01F 37/00* (2013.01); *H01F 38/023* (2013.01);
(Continued)

(58) Field of Classification Search
CPC ..... H02M 3/156; H02M 3/158; H02M 3/1588
See application file for complete search history.

(56) References Cited

U.S. PATENT DOCUMENTS

| 4,025,860 A | 5/1977 | Shibata et al. |
| 5,345,375 A | 9/1994 | Mohan |

(Continued)

FOREIGN PATENT DOCUMENTS

| DE | 10 2011 056 667 A1 | 6/2012 |
| EP | 1 768 137 A1 | 3/2007 |

(Continued)

OTHER PUBLICATIONS

International Search Report issued in International Patent Application No. PCT/JP2011/005302 dated Jun. 15, 2012.

(Continued)

*Primary Examiner* — Gary L Laxton
(74) *Attorney, Agent, or Firm* — Oliff PLC

(57) ABSTRACT

A magnetic component has a core on which windings are wound. The windings are electrically connected in series to constitute a coil of a first reactor. The winding constitutes a coil of a second reactor. The core has a leg portion on which the winding is wound, a leg portion on which the winding is wound, and a leg portion on which the winding is wound. When a current flows through the windings, magnetic fluxes (Continued)

produced from the windings, respectively, and flowing through the winding counteract each other. Furthermore, when a current flows through the winding, induced voltages produced from the windings, respectively, by the magnetic flux produced by the winding counteract each other.

8 Claims, 20 Drawing Sheets

(51) Int. Cl.
 *H01F 37/00* (2006.01)
 *H01F 38/02* (2006.01)
(52) U.S. Cl.
 CPC ..... *H02M 3/1584* (2013.01); *H01F 2038/026* (2013.01); *Y10T 307/50* (2015.04)

(56) References Cited

U.S. PATENT DOCUMENTS

| | | | |
|---|---|---|---|
| 6,333,570 B1 | 12/2001 | Ilg | |
| 6,574,125 B2 | 6/2003 | Matsukawa et al. | |
| 7,408,794 B2 | 8/2008 | Su | |
| 7,808,355 B2* | 10/2010 | Nagano | H01F 27/385 323/271 |
| 7,830,686 B2 | 11/2010 | Zeng et al. | |
| 8,130,524 B2 | 3/2012 | Lee et al. | |
| 8,188,720 B2* | 5/2012 | Kim | H02M 3/158 323/222 |
| 8,659,272 B2* | 2/2014 | Watanabe | H02M 3/1582 323/259 |
| 8,829,713 B2 | 9/2014 | Ishigaki et al. | |
| 9,019,061 B2* | 4/2015 | Chandrasekaran | H01F 3/10 29/602.1 |
| 9,077,241 B2* | 7/2015 | Haddad | H02M 3/158 |
| 9,099,232 B2* | 8/2015 | Chandrasekaran | H02M 3/155 |
| 2006/0139823 A1 | 6/2006 | Shoji et al. | |
| 2008/0036435 A1* | 2/2008 | Watanabe | H02M 3/1584 323/271 |
| 2009/0147541 A1 | 6/2009 | Shimada et al. | |
| 2009/0289751 A1 | 11/2009 | Nagano et al. | |
| 2010/0103585 A1 | 4/2010 | Mao et al. | |
| 2011/0180336 A1 | 7/2011 | Kurata | |
| 2011/0198933 A1 | 8/2011 | Ishigaki et al. | |
| 2012/0256571 A1* | 10/2012 | Ang | B60L 11/1803 318/400.3 |

FOREIGN PATENT DOCUMENTS

| | | |
|---|---|---|
| EP | 2 071 596 A2 | 6/2009 |
| JP | A-2000-295715 | 10/2000 |
| JP | A-2001-292567 | 10/2001 |
| JP | A-2004-166443 | 6/2004 |
| JP | A-2005-312249 | 11/2005 |
| JP | A-2006-187147 | 7/2006 |
| JP | A-2008-54477 | 3/2008 |
| JP | A-2008-131830 | 6/2008 |
| JP | A-2009-059995 | 3/2009 |
| JP | A-2009-146955 | 7/2009 |
| JP | A-2009-219303 | 9/2009 |
| JP | A-2009-284647 | 12/2009 |
| JP | A-2010-57288 | 3/2010 |
| JP | A-2010-87261 | 4/2010 |
| JP | A-2012-134266 | 7/2012 |
| JP | A-2013-013233 | 1/2013 |
| WO | 2010063326 A1 | 6/2010 |
| WO | WO 2011/092774 A1 | 8/2011 |
| WO | WO 2012/039131 A2 | 3/2012 |

OTHER PUBLICATIONS

International Preliminary Report on Patentability issued in International Patent Application No. PCT/JP2011/005302 dated Oct. 9, 2012.
Feb. 13, 2014 Office Action issue in U.S. Appl. No. 13/027,726.
Apr. 15, 2014 Japanese Office Action issued in Japanese Application No. 2012-061635 (with translation).
Jul. 1, 2013 International Search Report issued in International Application No. PCT/JP2013/001828.
U.S. Appl. No. 13/814,342, filed Feb. 5, 2013 in the name of Ishigaki et al.
Jun. 26, 2015 Office Action issued in U.S. Appl. No. 13/814,342.
Mar. 18, 2013 Written Opinion of the International Searching Authority issued in International Application No. PCT/JP2013/001828.

* cited by examiner

FIG.12
(a)
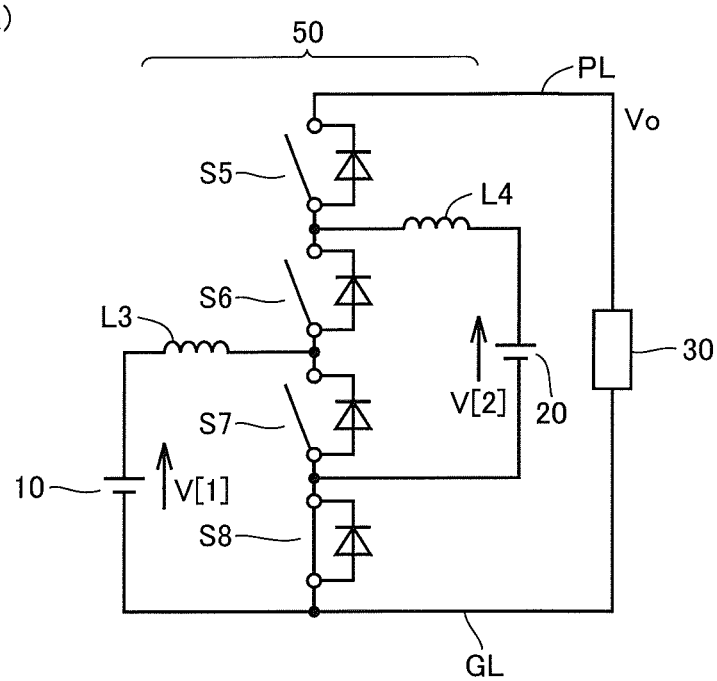
(b)
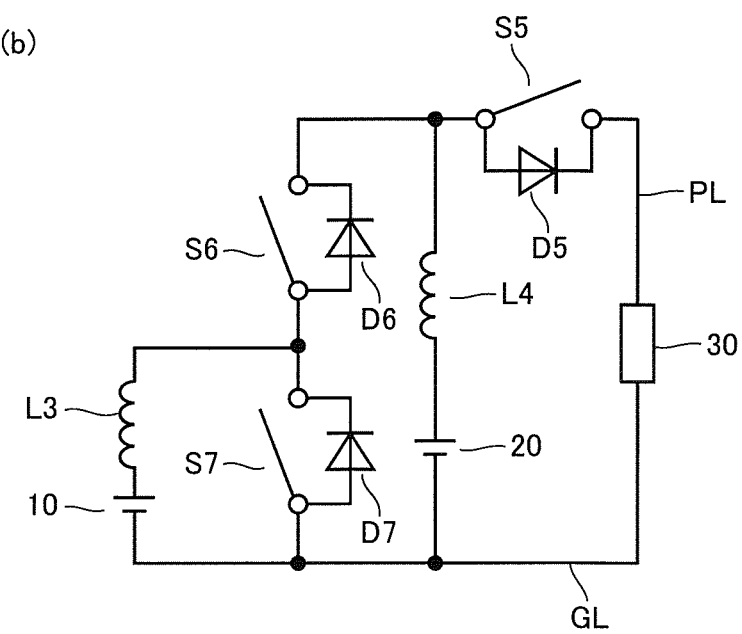

FIG.13
(a)
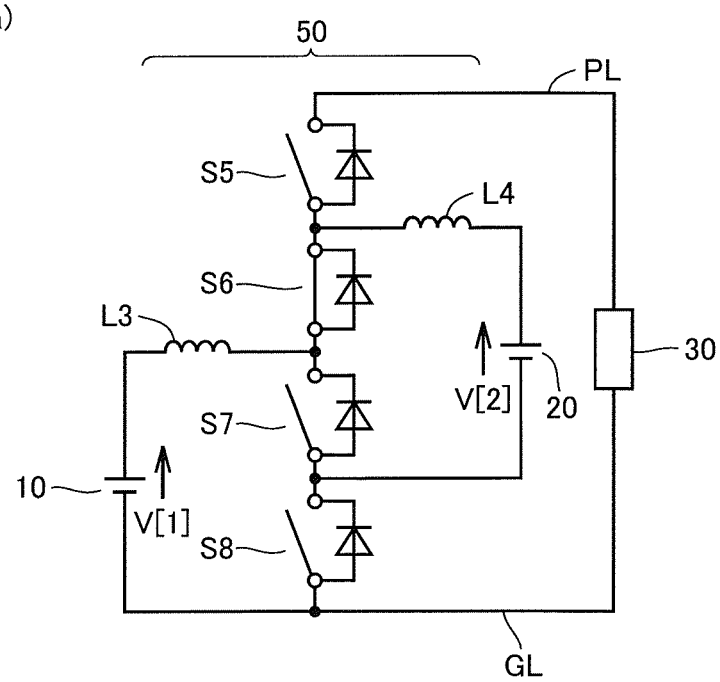
(b)
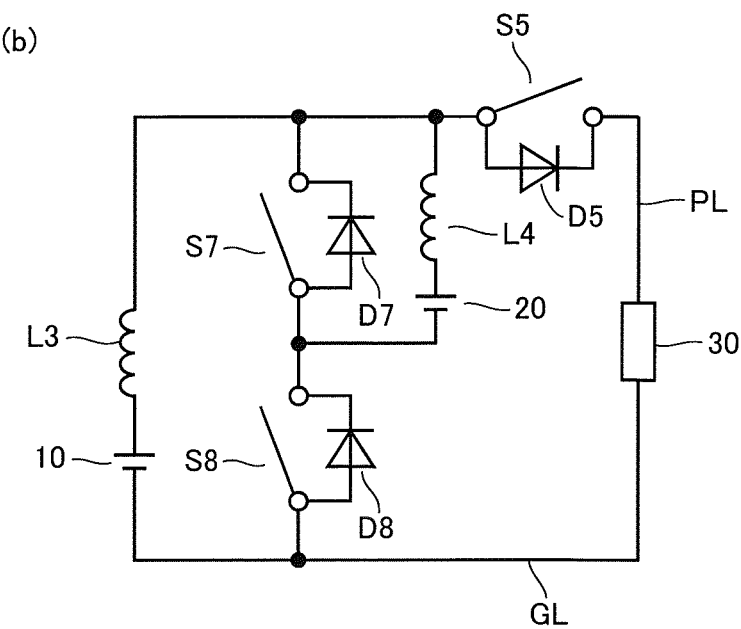

FIG.14
(a)
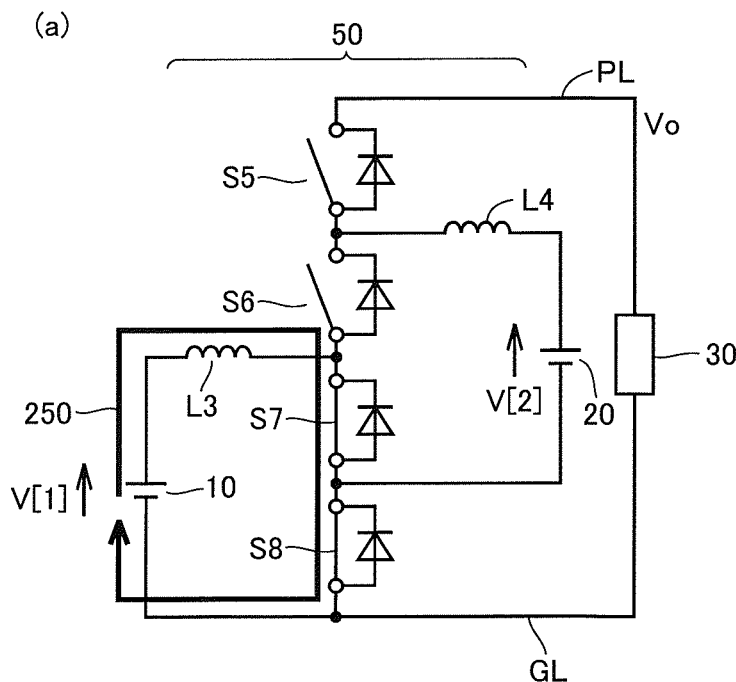
(b)
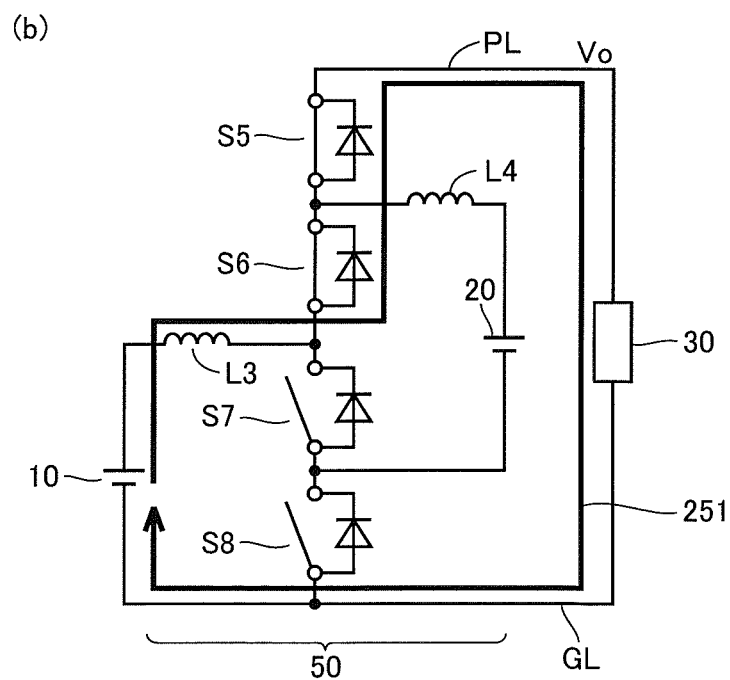

FIG.15
(a)
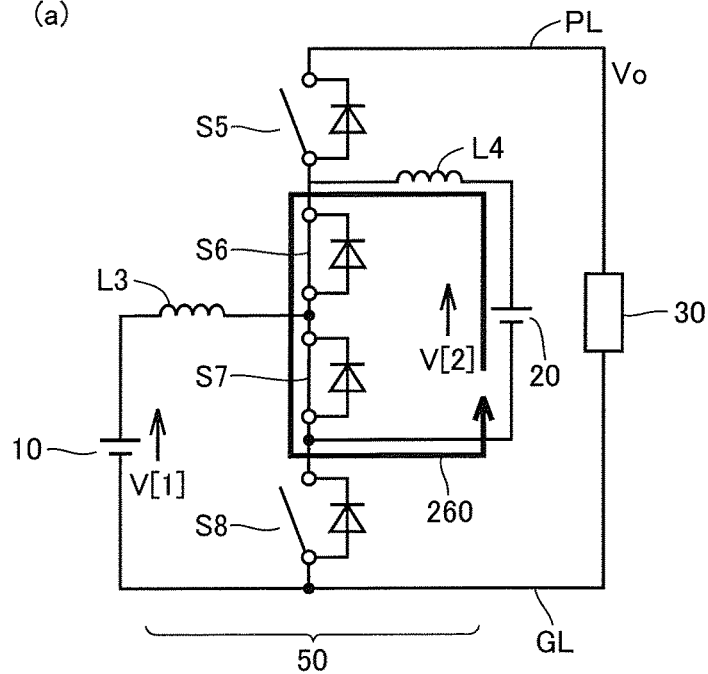
(b)
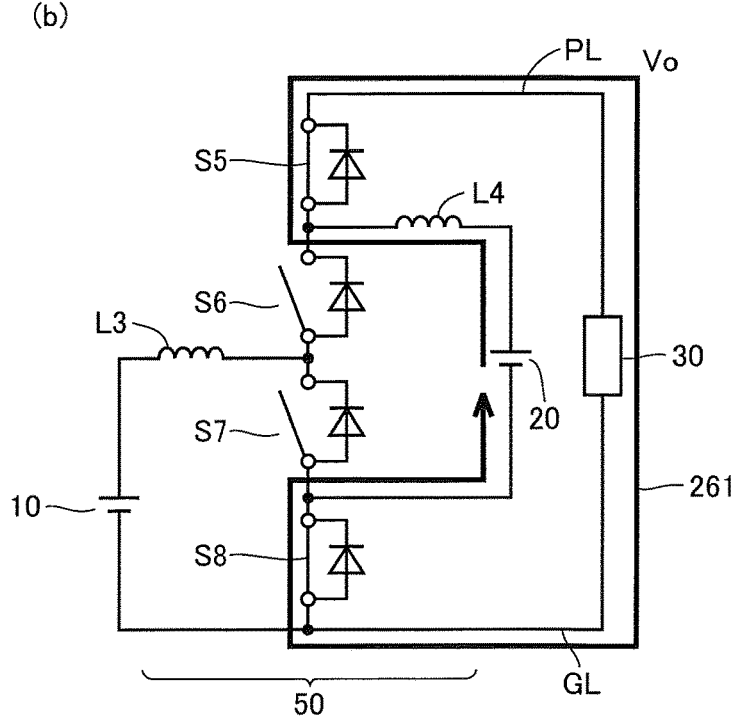

FIG.16
(a)
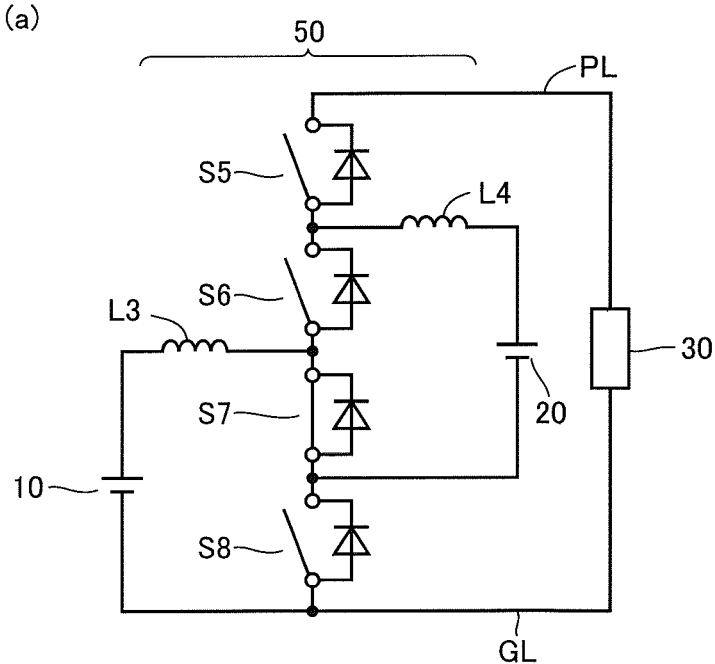
(b)
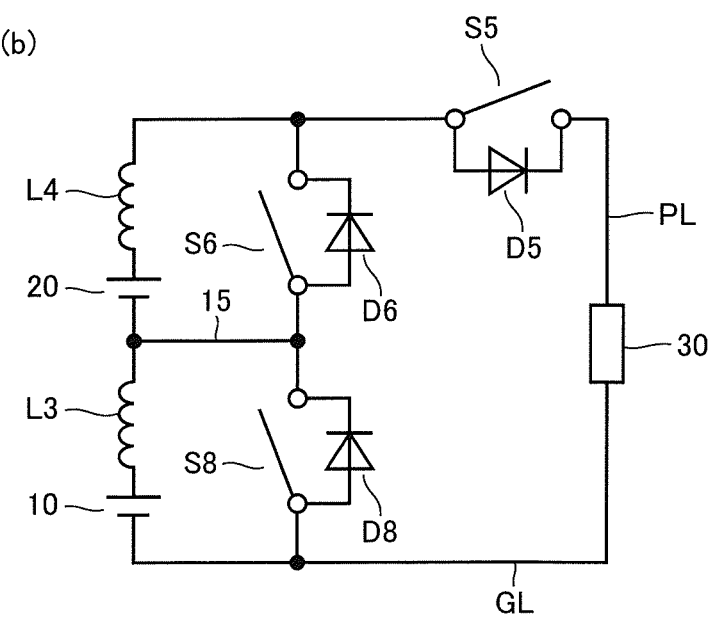

FIG.17
(a)
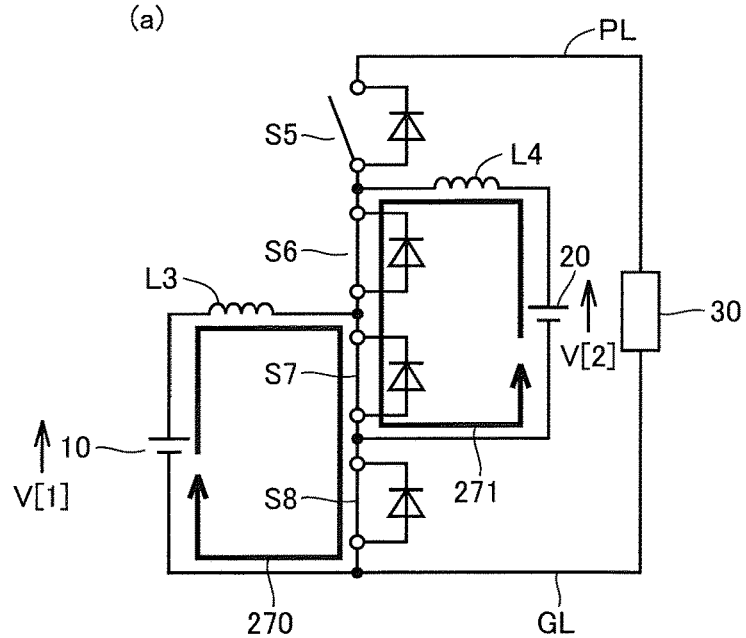
(b)
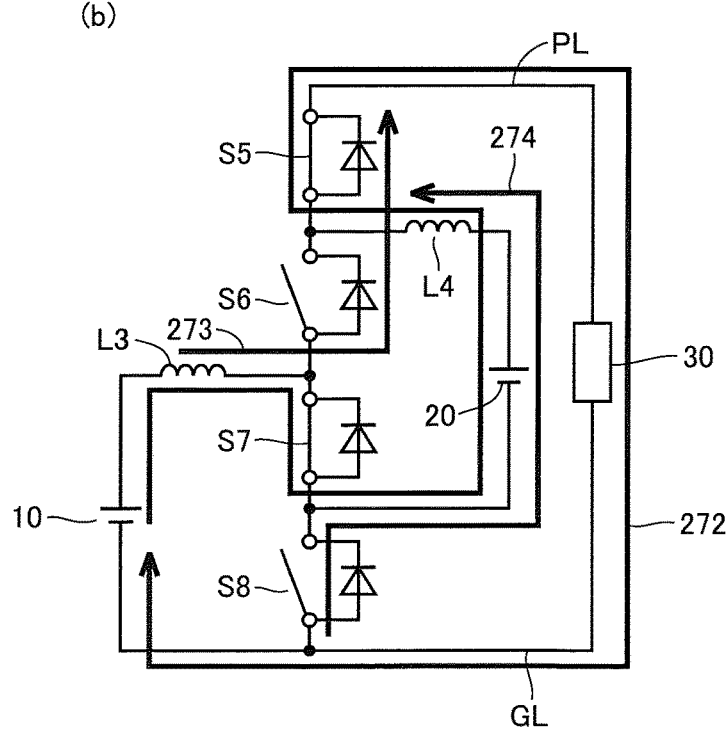

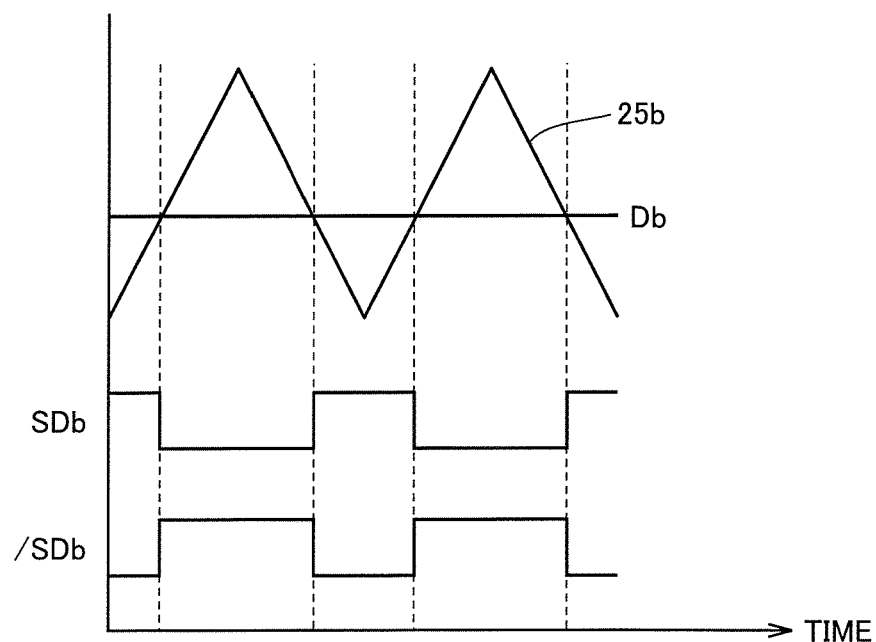

FIG.25
(a)
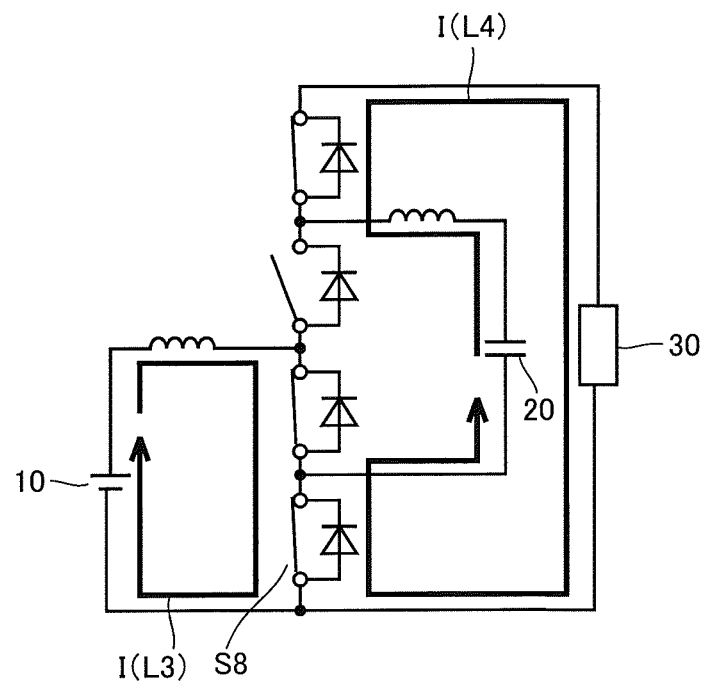
(b)
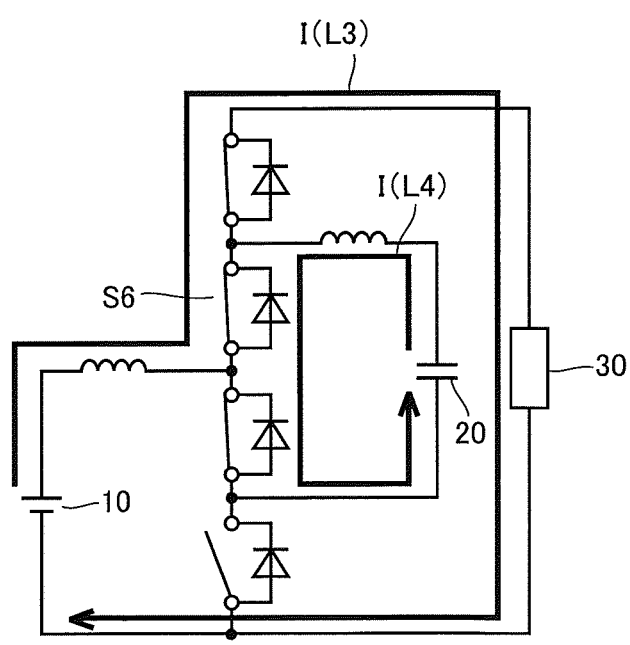

FIG.26
(a)
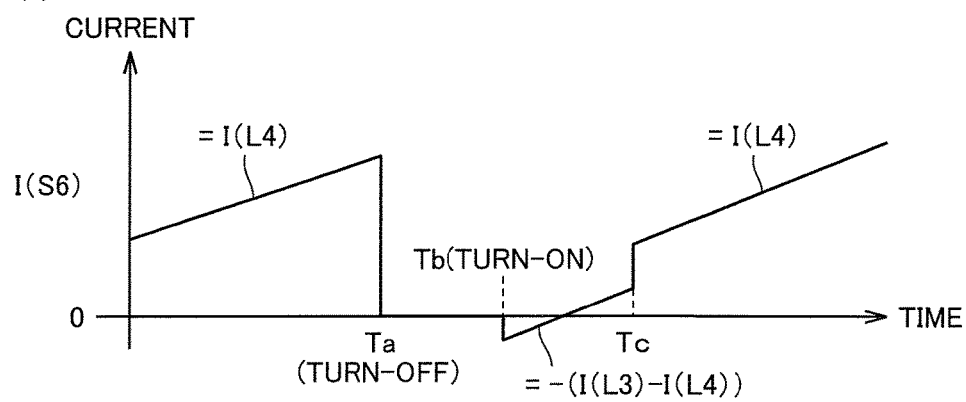
(b)
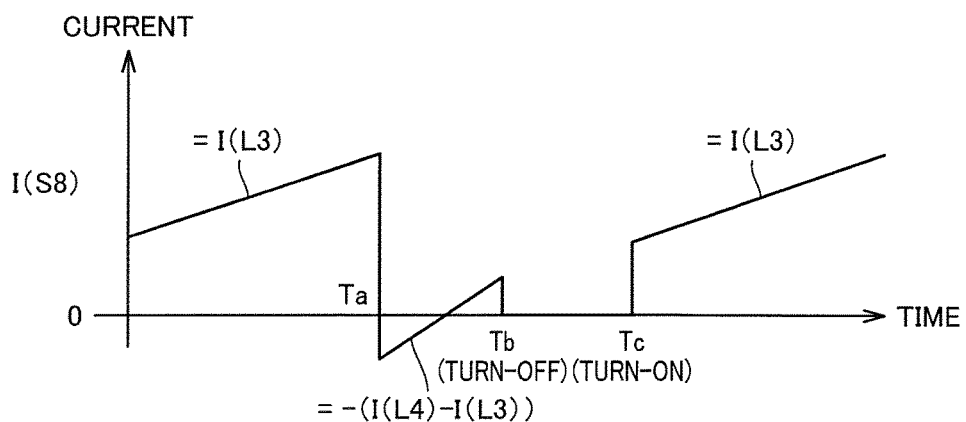

FIG.28
(a)
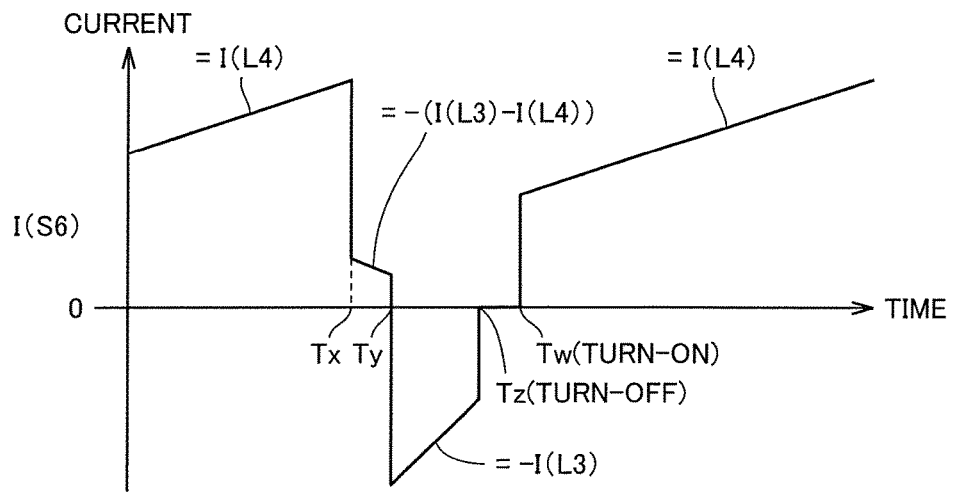
(b)
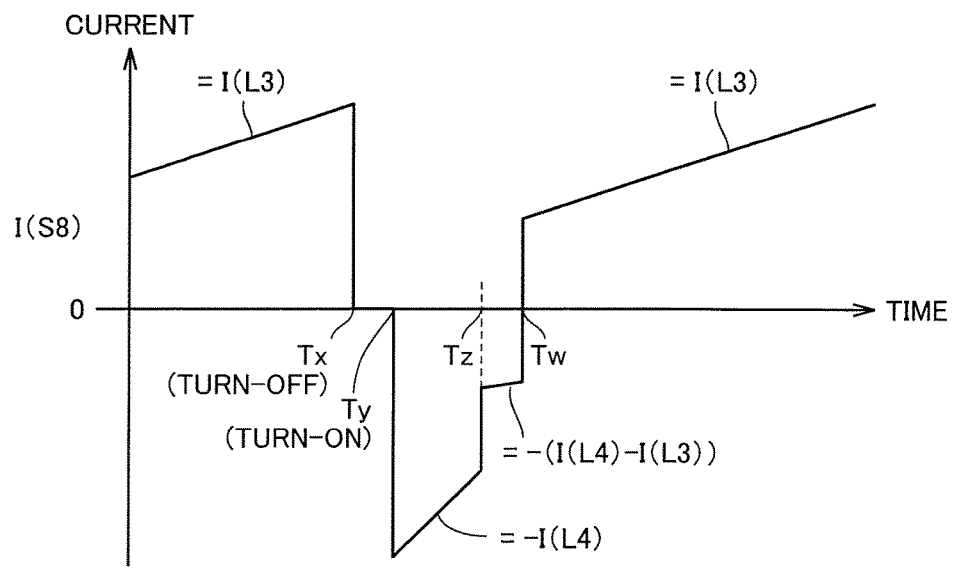

FIG.29

| OPERATING STATE | STATE OF DC POWER SOURCE 10 – STATE OF DC POWER SOURCE 20 | WAVEFORMS OF I(L3) AND I(L4) | TURN-ON LOSS IS REDUCED | TURN-OFF LOSS IS REDUCED | CONDUCTION LOSS IS REDUCED | CONDUCTION LOSS IS REDUCED |
|---|---|---|---|---|---|---|
| A | POWER RUNNING – POWER RUNNING | I(L4) / I(L3) Ta Tb Tc | IN S6 AT Tb | IN S8 AT Tb | IN S8 AT Ta-Tb | IN S6 AT Tb-Tc |
| B | REGENERATION – REGENERATION | I(L3) / I(L4) Ta Tb Tc | IN S8 AT Tb | IN S6 AT Tb | IN S6 AT Ta-Tb | IN S8 AT Tb-Tc |
| C | REGENERATION – POWER RUNNING | I(L4) / I(L3) Ta Tb Tc | IN S7 AT Ta | IN S5 AT Ta | IN S5 AT Ta-Tb | IN S7 AT Tc-Ta |
| D | POWER RUNNING – REGENERATION | Tc / I(L3) / I(L4) Ta Tb | IN S5 AT Tc | IN S7 AT Tc | IN S5 AT Tb-Tc | IN S7 AT Tc-Ta |

MAGNETIC COMPONENT, POWER CONVERTER AND POWER SUPPLY SYSTEM

TECHNICAL FIELD

The present invention relates to a magnetic component, a power converter and a power supply system, and more particularly to a magnetic component in which two reactors included in different current paths are integrated as well as a power converter and a power supply system including the magnetic component.

BACKGROUND ART

An inductive element used for a power converter is generally formed by winding coils on a core made of a magnetic material, which is likely to increase in size. It has therefore been proposed to form a plurality of reactors integrally by a single magnetic component in a circuit including a plurality of inductive elements.

For example, Japanese Patent Laying-Open No. 2009-59995 (PTL 1) describes a configuration of a composite magnetic component in which a transformer and a reactor are integrated. In the configuration described in PTL 1, a primary winding and a secondary winding are wound on one of two cores constituting the transformer, and an extension of the primary winding is wound on the other core. Accordingly, the reactor connected in series with the primary winding of the transformer can be formed integrally with the transformer by means of the above-mentioned extension.

Japanese Patent Laying-Open No. 2009-284647 (PTL 2) describes a configuration of a composite transformer in which first and second inductors and a transformer are formed integrally.

CITATION LIST

Patent Literature

PTL 1: Japanese Patent Laying-Open No. 2009-59995
PTL 2: Japanese Patent Laying-Open No. 2009-284647

SUMMARY OF INVENTION

Technical Problem

As a mode of power converter, there exists a circuit configuration having two reactors respectively included in current paths independently controlled in current. In such a circuit, if an induced voltage is produced in one of the reactors by the current flowing through the other reactor, each current can no longer be controlled independently. Therefore, it is a subject for the configuration in which these reactors are integrated to consider preventing an induced voltage from being produced in one of the reactors by the current flowing through the other reactor.

In the composite magnetic component of PTL 1, the transformer and reactor connected in series are integrated. That is, magnetic elements included in a common current path are integrated, which does not present a solution for the above-described subject.

In the composite transformer of PTL 2, the current paths in the first and second reactors are included on the primary side and secondary side of the transformer. Therefore, the composite transformer of PTL 2 is applied to a circuit aiming at causing induced voltages to act on each other between the current path in the first reactor and the current path in the second reactor. Hence, PTL 2 also fails to disclose an integrated structure that can solve the above-described subject.

The present invention was made to solve such a problem, and has an object to integrally form two reactors respectively included in current paths independently controlled in current, thereby achieving reduction in size and weight of a magnetic component as well as a power converter and a power supply system including the magnetic component.

Solution to Problem

In an aspect of the present invention, a magnetic component includes first and second windings electrically connected in series through which a first current flows, a third winding through which a second current flows, and a core. The core is configured to include a first section on which the first winding is wound, a second section on which the second winding is wound, and a third section on which the third winding is wound. The first to third windings are wound on the first to third sections, respectively, such that, in a state where magnetic saturation does not occur in said core, (i) a magnetic flux produced from the first winding and flowing through the third winding and a magnetic flux produced from the second winding and flowing through the third winding counteract each other, when the first current flows through the first and second windings, and (ii) induced voltages produced in the first and second windings, respectively, by a magnetic flux produced from the third winding counteract each other, when the second current flows through the third winding.

In another aspect of the present invention, a magnetic component includes first and second windings electrically connected in series through which a first current flows, a third winding through which a second current flows, and a core. The core is configured to include a first section on which the first winding is wound, a second section on which the second winding is wound, and a third section on which the third winding is wound. The first and second windings are wound on the first and second sections, respectively, such that the first and second windings have winding directions opposite to each other. The core on which the first to third windings are wound is configured such that, in a state where magnetic saturation does not occur in the core, a magnetic resistance of a first magnetic circuit passing through the first section and a magnetic resistance of a second magnetic circuit passing through the second section are equivalent, when the second current flows through the third winding.

Preferably, in the magnetic component, in the core on which the first to third windings are wound, in a state where magnetic saturation does not occur in the core, (i) a magnetic flux produced from the first winding and flowing through the third winding and a magnetic flux produced from the second winding and flowing through the third winding counteract each other, when the first current flows through the first and second windings, and (ii) induced voltages produced in the first and second windings, respectively, by a magnetic flux produced from the third winding counteract each other, when the second current flows through the third winding.

In still another aspect of the present invention, a power converter includes first and second reactors electrically connected between a DC power source and a load, and a plurality of switching elements arranged such that a first current flowing through the first reactor and a second current flowing through the second reactor are controlled independently. The first and second reactors are formed integrally by a single magnetic component. The magnetic component includes first and second windings electrically connected in series through which a first current flows, a third winding through which the second current flows, and a core. The core is configured to include a first section on which the first winding is wound, a second section on which the second winding is wound, and a third section on which the third winding is wound. The first to third windings are wound on the first to third sections, respectively, such that, in a state where magnetic saturation does not occur in said core, (i) a magnetic flux produced from the first winding and flowing through the third winding and a magnetic flux produced from the second winding and flowing through the third winding counteract each other, when the first current flows through the first and second windings, and (ii) induced voltages produced in the first and second windings, respectively, by a magnetic flux produced from the third winding counteract each other, when the second current flows through the third winding.

Preferably, in the power converter, in the core on which the first to third windings are wound, in a state where magnetic saturation does not occur in said core, when the second current flows through the third winding, a magnetic resistance of a first magnetic circuit passing through the first section and a magnetic resistance of a second magnetic circuit passing through the second section are equivalent. The first and second windings have winding directions opposite to each other.

More preferably, the power converter further includes a control device configured to control on/off of the plurality of switching elements so as to control an output voltage on a power line connected to the load. The control device controls a phase difference between a first carrier signal used for first pulse width modulation control for controlling power conversion in a first power conversion path through which the first current flows and a second carrier signal used for second pulse width modulation control for controlling power conversion in a second power conversion path through which the second current flows such that any critical point of one of the first and second currents coincides with any critical point of the other one of the first and second currents, and then generates signals for controlling on/off of the plurality of switching elements in accordance with the first and second pulse width modulation control.

In still another aspect of the present invention, a power supply system includes a first DC power source, a second DC power source, and a power converter configured to execute DC power conversion between a power line electrically connected to a load and the first and second DC power sources. The power converter includes a plurality of switching elements, a first reactor, and a second reactor. The plurality of switching elements are arranged to be included both in a first power conversion path formed between the first DC power source and the power line and in a second power conversion path formed between the second DC power source and the power line. The first reactor is arranged to be included in the first power conversion path. The second reactor is arranged to be included in the second power conversion path. The first and second reactors are formed integrally by a single magnetic component. The magnetic component includes first and second windings electrically connected in series through which a first current flows, a third winding through which the second current flows, and a core. The core is configured to include a first section on which the first winding is wound, a second section on which the second winding is wound, and a third section on which the third winding is wound. The first to third windings are wound on the first to third sections, respectively, such that, in a state where magnetic saturation does not occur in said core, (i) a magnetic flux produced from the first winding and flowing through the third winding and a magnetic flux produced from the second winding and flowing through the third winding counteract each other, when the first current flows through the first and second windings, and (ii) induced voltages produced in the first and second windings, respectively, by a magnetic flux produced from the third winding counteract each other, when the second current flows through the third winding.

Preferably, in the power supply system, the plurality of switching elements include a first switching element electrically connected between a first node and the power line, a second switching element electrically connected between a second node and the first node, a third switching element electrically connected between a third node electrically connected to a negative terminal of the second DC power source and the second node, and a fourth switching element electrically connected between a negative terminal of the first DC power source and the third node. The first reactor is electrically connected between a positive terminal of the first DC power source and the second node, and the second reactor is electrically connected between the positive terminal of the second DC power source and the first node.

More preferably, in the power supply system, the power converter is configured to be switchable, by controlling the plurality of switching elements, between a first operation mode in which the DC power conversion is executed with the first and second DC power sources electrically connected in series with the power line and a second operation mode in which the first and second DC power sources execute the DC power conversion to the power line in parallel.

Still more preferably, the power supply system further includes a control device configured to control on/off of the plurality of switching elements so as to control an output voltage on the power line. The control device controls a phase difference between a first carrier signal used for first pulse width modulation control for controlling power conversion in the first power conversion path through which the first current flows and a second carrier signal used for second pulse width modulation control for controlling power conversion in the second power conversion path through which the second current flows such that any critical point of one of the first and second currents coincides with any critical point of the other one of the first and second currents, and then generates signals for controlling on/off of the plurality of switching elements in accordance with the first and second pulse width modulation control.

Further preferably, the phase difference is controlled such that one of a rising edge and a falling edge of a first control pulse signal obtained by the first pulse width modulation control coincides with the other one of the rising edge and the falling edge of a second control pulse signal obtained by the second pulse width modulation control.

Advantageous Effects of Invention

According to the present invention, two reactors respectively included in current paths independently controlled in current are formed integrally, thereby achieving reduction in size and weight of a magnetic component as well as a power converter and a power supply system including the magnetic component.

BRIEF DESCRIPTION OF DRAWINGS

FIG. 12 includes circuit diagrams illustrating a first circuit operation in the parallel connection mode.

FIG. 13 includes circuit diagrams illustrating a second circuit operation in the parallel connection mode.

FIG. 14 includes circuit diagrams illustrating DC/DC conversion (step-up operation) for a first DC power source in the parallel connection mode.

FIG. 15 includes circuit diagrams illustrating DC/DC conversion (step-up operation) for a second DC power source in the parallel connection mode.

FIG. 16 includes circuit diagrams illustrating a circuit operation in the series connection mode.

FIG. 17 includes circuit diagrams illustrating DC/DC conversion (step-up operation) in the series connection mode.

FIG. 20 is a diagram of waveforms representing an exemplary operation for controlling the second power source.

FIG. 21 is a table illustrating settings of control signals for switching elements.

FIG. 25 includes circuit diagrams illustrating current paths in a predetermined period in FIG. 24.

FIG. 26 includes diagrams of current waveforms of the switching elements in the current phase shown in FIG. 24.

FIG. 28 includes diagrams of current waveforms of the switching elements in the current phase shown in FIG. 27.

FIG. 29 is a table for illustrating carrier phase control in each operation state of the DC power sources.

DESCRIPTION OF EMBODIMENTS

Figure 1:
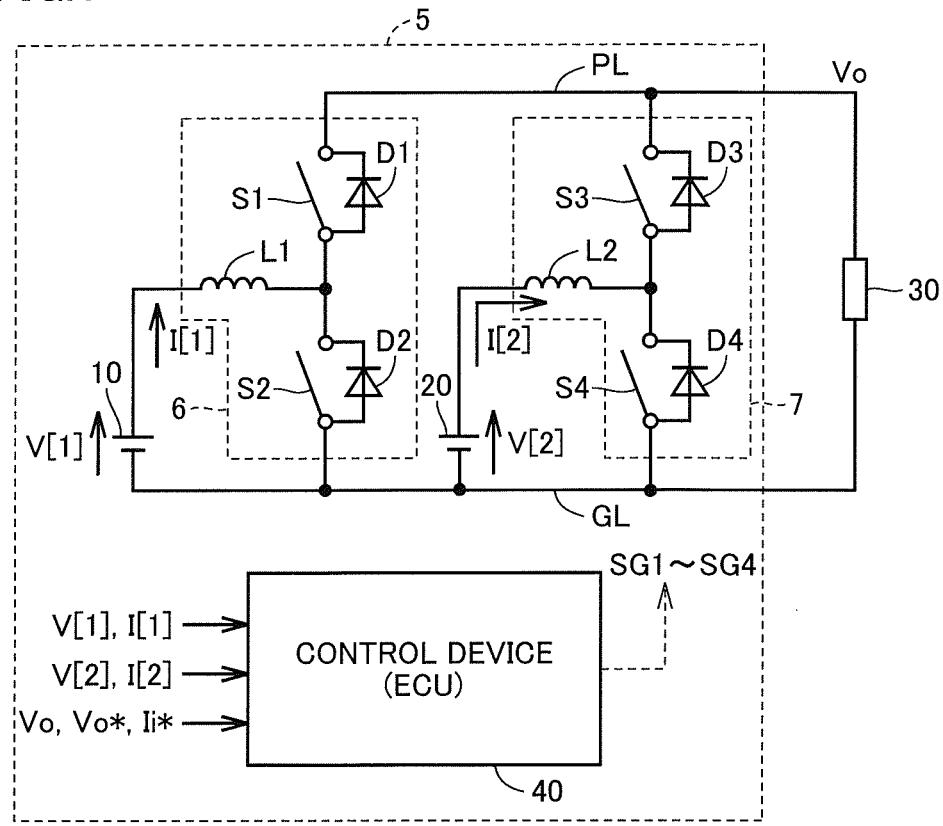
FIG. 1 is a circuit diagram showing an exemplary configuration of a power converter and a power supply system including a magnetic component in accordance with an embodiment of the present invention.

In the following, embodiments of the present invention will be described in detail with reference to the figures. In the figures, the same or corresponding portions are denoted by the same reference characters and, basically, description thereof will not be repeated.

First Embodiment

FIG. 1 is a circuit diagram showing an exemplary configuration of a power converter and a power supply system including a magnetic component in accordance with an embodiment of the present invention.

Referring to FIG. 1, power supply system 5 includes a DC power source 10, a power converter 6, a DC power source 20, and a power converter 7. Power supply system 5 controls electric power supply from DC power sources 10, 20 to a load 30. Alternatively, power supply system 5 charges DC power sources 10, 20 with electric power generated by load 30.

In the present embodiment, DC power sources 10 and 20 are implemented by a power storage device such as a secondary battery or an electric double layer capacitor. DC power source 10 is implemented by, for example, a secondary battery such as a lithium ion secondary battery or a nickel-metal hydride battery. DC power source 20 is implemented by, for example, a DC voltage source element having superior output characteristic such as an electric double-layer capacitor or a lithium ion capacitor. DC power sources 10 and 20 correspond to the "first DC power source" and the "second DC power source", respectively. However, it is also possible to implement DC power sources 10 and 20 by power storage devices of the same type.

Power converter 6 is connected between DC power source 10 and load 30. Power converter 7 is connected between DC power source 20 and load 30. It is understood that, in power supply system 5, DC power sources 10 and 20 are connected in parallel to load 30 via power converters 6 and 7.

Load 30 operates receiving output voltage Vo from converters 6 and 7. A voltage command value Vo* of output voltage Vo is set to a value appropriate for the operation of load 30. The voltage command value may be variably set in accordance with the state of load 30. Load 30 may be configured to be able to generate charging power for charging DC power sources 10 and 20 by regenerative power generation or the like. For example, load 30 is configured so as to include a traction motor for an electric powered vehicle, such as a hybrid vehicle and an electric vehicle, and an inverter for controlling driving of that motor.

Power converter 6 executes bidirectional DC/DC conversion between DC power source 10 and a power line PL connected to load 30. Power converter 7 executes bidirectional DC/DC conversion between DC power source 20 and power line PL. Hereinafter, power converters 6 and 7 may be referred to as converters 6 and 7, respectively.

Each of converters 6 and 7 has a configuration of a so-called step-up chopper circuit. Specifically, converter 6 has power semiconductor switching elements (hereinafter briefly called "switching elements" as well) S1, S2 and a reactor L1. Switching elements S1 and S2 are connected in series between power line PL and a ground line GL. Reactor L1 is electrically connected between the positive terminal of DC power source 10 and the connection node between switching elements S1 and S2.

Converter 7 includes switching elements S3, S4 and a reactor L2. Switching elements S3 and S4 are connected in series between power line PL and ground line GL. Reactor L2 is electrically connected between the positive terminal of DC power source 20 and the connection node between switching elements S3 and S4.

In the present embodiment, the switching elements can be implemented by an IGBT (Insulated Gate Bipolar Transistor), a power MOS (Metal Oxide Semiconductor) transistor, a power bipolar transistor, or the like. For switching elements S1 to S4, anti-parallel diodes D1 to D4 are arranged. Switching elements S1 to S4 can be on/off controlled in response to control signals SG1 to SG4 from a control device 40.

In converters 6 and 7, each implemented by a step-up chopper circuit, DC output is controlled in accordance with the duty ratio indicating the on-period ratio of an upper arm element (S1, S3) and a lower arm element (S2, S4) in a predetermined period (switching period). In general, switching elements S1 to S4 are controlled such that the upper arm element and the lower arm element are turned on/off in complementary manner in accordance with a comparison between a DC signal indicating the duty ratio and a carrier signal of predetermined frequency.

The voltage conversion ratio (step-up ratio) in the step-up chopper circuit is known to be expressed by Equation (1) below, using voltage Vi at the lower voltage side (DC power source side), output voltage VH at the higher voltage side (load side) and duty ratio DT of the lower arm element. Here, duty ratio DT is defined by the on-period ratio of the lower arm element to the switching period which is the sum of the on- and off-periods of the lower arm element. The upper arm element is turned on in the off-period of the lower arm element.

$$VH = 1/(1-DT) \times Vi \quad (1)$$

Control device 40 is implemented by, for example, a CPU (Central Processing Unit) not shown and an electronic control unit (ECU) having a memory. Control device 40 is configured to perform arithmetic processing using a detection value obtained by each sensor based on a map and a program stored in the memory. Alternatively, at least part of control device 40 may be configured to execute predetermined numeric and logic arithmetic processing by hardware, such as an electronic circuit.

Control device 40 generates control signals SG1 to SG4 that control on/off of switching elements S1 to S4 in order to control output voltage Vo to load 30. Although not shown in FIG. 1, detectors (voltage sensor, current sensor) are provided for detecting voltage (denoted by V[1]) and current (denoted by I[1]) of DC power source 10, voltage (denoted by V[2]) and current (denoted by I[2]) of DC power source 20, and output voltage Vo. In converter 6, current I[1] is equivalent to current I(L1) flowing through reactor L1. Similarly, in converter 7, current I[2] is equivalent to current I(L2) flowing through reactor L2.

Figure 2:
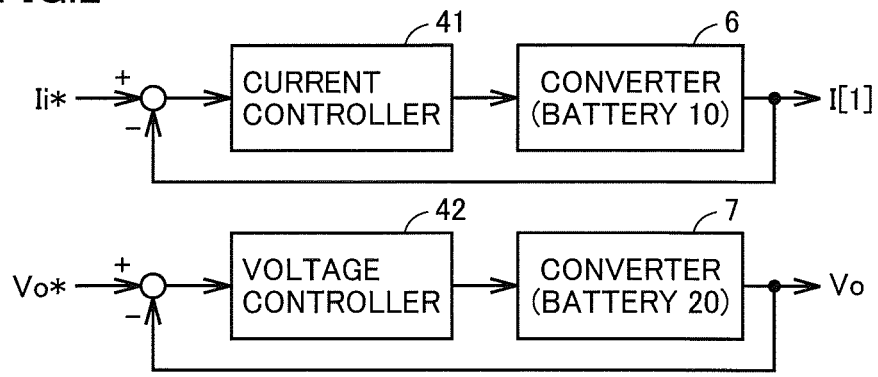
FIG. 2 is a typical control block diagram of the power supply system shown in FIG. 1.

FIG. 2 is a typical control block diagram of power supply system 5 shown in FIG. 1.

Referring to FIG. 2, if control common to converters 6 and 7 (voltage control of output voltage Vo) is executed simultaneously, there is a possibility of circuit failure. Therefore, converters 6 and 7 execute DC/DC conversion between DC power sources 10, 20 and load 30 such that one of the batteries operates as a voltage source and the other battery operates as a current source.

Here, converter 6 shall control battery current I[1] in accordance with a current command value Ii* such that DC power source 10 operates as a current source. On the other hand, converter 7 controls output voltage Vo in accordance with voltage command value Vo* such that DC power source 20 operates as a voltage source.

Here, a relation represented by Equation (2) below holds among electric power P[1] of DC power source 10, electric power P[2] of DC power source 20, output power Po to load 30 and current command value Ii* of the current source.

$$P[2] = Po - P[1] = Po - V[1] \times Ii^* \quad (2)$$

By setting current command value Ii* such that P[1]*=V[1]×Ii* is kept constant in accordance with the detected value of voltage V[1] of DC power source 10, electric power P[1] of DC power source 10 constituting the current source can be regulated to a power command value P[1]*.

It is also possible to exert control with DC power source 20 operating as a current source and DC power source 10 operating as a voltage source. In this case, by setting current command value Ii* such that V[2]×Ii* is kept constant for electric power P[2] of DC power source 20 constituting a current source, electric power P[2] of DC power source 20 can be regulated in accordance with the power command value.

A current controller 41 controls the duty ratio of converter 6 such that current I[1] of DC power source 10 corresponds to current command value Ii*. Specifically, when a current deviation (Ii*−I[1]) is higher than zero, the duty ratio is changed such that the on-period of the lower arm element (S2) becomes longer in order to increase current I[1]. In contrast, when the current deviation (Ii*−I[1]) is lower than zero, the duty ratio is changed such that the on-period of the upper arm element (S1) of converter 6 becomes longer in order to reduce current I[1].

A voltage controller 42 controls the duty ratio of converter 7 such that output voltage Vo corresponds to voltage command value Vo*. When a voltage deviation (Vo*−Vo) is higher than zero, voltage controller 42 changes the duty ratio such that the on-period ratio of the lower arm element (S4) of converter 7 becomes larger in order to increase output voltage Vo. In contrast, when the voltage deviation (Vo*−Vo) is lower than zero, voltage controller 42 changes the duty ratio such that the on-period ratio of the upper arm element (S3) of converter 7 becomes larger in order to reduce output voltage Vo.

In this way, DC power source 10 is subjected to current control by converter 6 in accordance with current command value Ii*. On the other hand, the output of DC power source 20 is controlled by converter 7 for voltage control in accordance with voltage command value Vo*.

Figure 3:
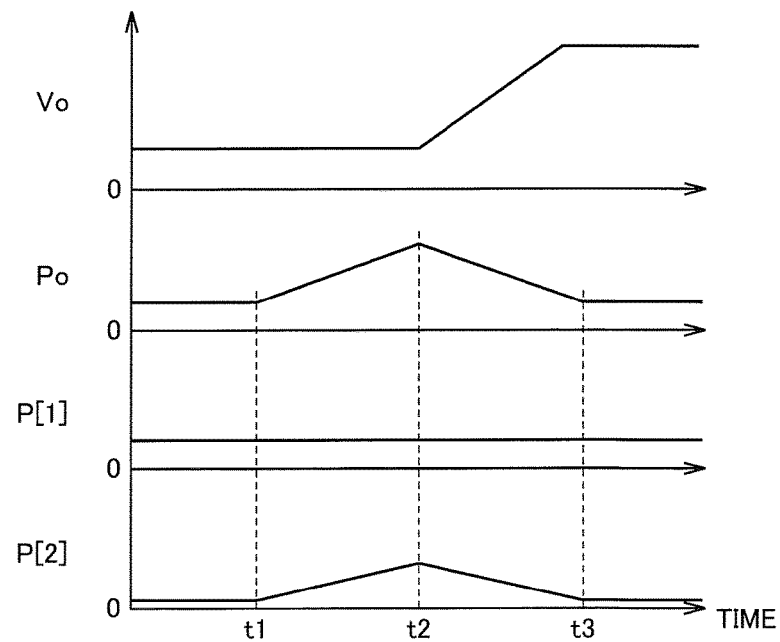
FIG. 3 is a diagram of operation waveforms of the power supply system shown in FIG. 1.

FIG. 3 shows exemplary operation waveforms of power supply system 5 controlled by the control block shown in FIG. 2.

Referring to FIG. 3, operation waveforms in the case where P[1]>0 and P[2]>0 hold, DC power sources 10 and 20 discharge, and electric power is supplied to load 30 are shown. That is, output power Po expressed by Po=P[1]+P[2] is higher than zero.

Since current I[1] of DC power source 10 is controlled to be constant by converter 6 in accordance with current command value Ii*, electric power P[1] of DC power source 10 is also constant. Therefore, in the period from time t1 to time t2 during which electric power of load 30 increases with voltage command value Vo* being constant, P[1] is maintained constant, while electric power P[2] of DC power source 20 increases.

In the period from time t2 to time t3, output power Po decreases, while voltage command value Vo* increases. Output voltage Vo is increased by converter 7 in accordance with voltage command value Vo*. Furthermore, electric power P[1] is constant because current I[1] is controlled to be constant by converter 6, while electric power P[2] gradually decreases.

In this way, electric power P[1] of DC power source 10 subjected to current control is controlled in accordance with current command value Ii*. On the other hand, DC power source 20 will operate as a buffer for supplying the difference between output power Po to load 30 and battery electric power P[1] while ensuring output voltage Vo.

As described above, in power supply system 5, current I(L1) flowing through reactor L1 of converter 6 and current I(L2) flowing through reactor L2 of converter 7 are controlled independently. That is, converters 6 and 7 could no longer be controlled appropriately if an induced voltage is produced in reactor L2 by current I(L1) or to the contrary, an induced voltage is produced in reactor L1 by current I(L2).

If reactors L1 and L2 are formed integrally in accordance with PTL 1 or PTL 2, it will become difficult to independently control the respective reactors in current due to interference of induced voltage. First, as a comparative example, to reliably avoid interference of induced voltage, a configuration in the case where reactors L1 and L2 are formed as independent separate magnetic components will be described with reference to FIG. 4.

Figure 4:
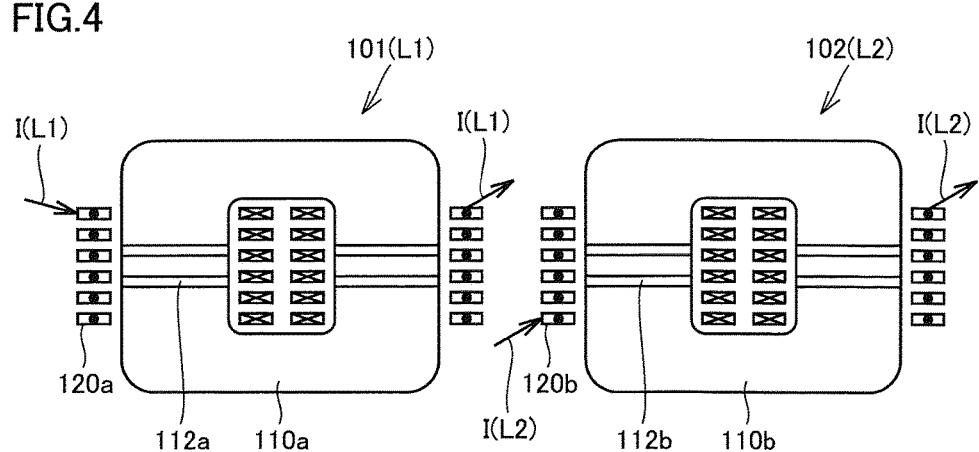
FIG. 4 is a conceptual view illustrating a configuration of two reactors formed as separate magnetic components as a comparative example.

Referring to FIG. 4, a magnetic component 101 constituting reactor L1 is formed by a core 110a and a winding 120a wound on core 110a. Gaps 112a are provided in core 110a. Similarly, a magnetic component 102 constituting reactor L2 is formed by a core 110b and a winding 120b wound on core 110b. Gap 112b are provided in core 110b.

An inductance value L of the reactor is expressed by the number of turns N of the coil, a magnetic resistance R of the magnetic material, and a magnetic resistance r of the gap, in accordance with Equation (3) below.

$$L = N \times N/(R+r) \quad (3)$$

It is known that magnetic resistance R can be adjusted by the magnetic property (relative permeability), size and shape (magnetic path length and cross sectional area) of cores 110a and 110b. Magnetic resistance r can be adjusted by the gap length and the number of gaps 112a and 112b.

Since the magnetic material used for cores 110a and 110b has nonlinear characteristics, characteristics will be degraded due to a saturation phenomena if an excess magnetic flux is produced. Therefore, it is necessary to design an effective sectional area S of the core such that a maximum magnetic flux density B(max) when a design maximum current I(max) flows does not exceed the saturation magnetic flux density of the core. B(max) is obtained by Equation (4) below.

$$B(\max) = I(\max) \times N/(R+r)/S \quad (4)$$

In this way, when reactors L1 and L2 are formed by separate magnetic components 101 and 102, interference of induced voltage can be avoided, and a desired inductance value can be obtained while avoiding magnetic saturation because of the design of each magnetic component. That is, the inductance value can relatively easily be designed. On the other hand, converters 6, 7 and power supply system 5 may be increased in size due to size increase of reactors L1 and L2 because two cores are required.

The present embodiment will describe a configuration for forming reactors L1 and L2 such that interference due to an induced voltage will not occur and so as to be an integral magnetic component.

Figure 5:
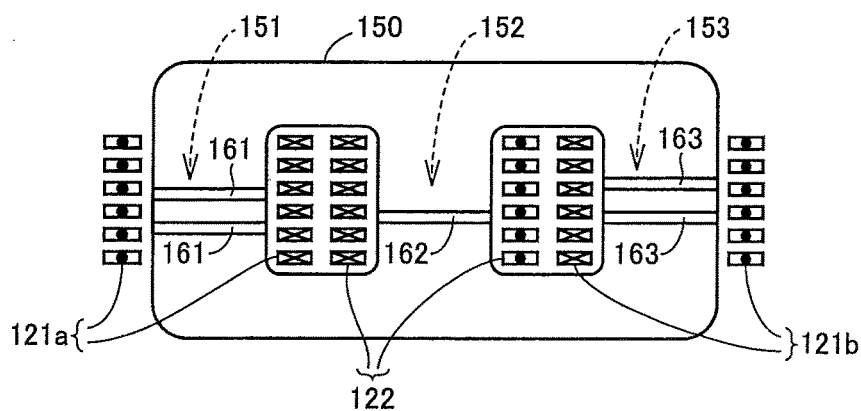
FIG. 5 is a sectional view for illustrating a configuration of the magnetic component in accordance with an embodiment of the present invention.

FIG. 5 is a schematic view illustrating a configuration of a magnetic component 100 in accordance with an embodiment of the present invention. FIG. 5 shows a cross sectional view of magnetic component 100.

Magnetic component 100 includes a core 150 and windings 121a, 121b and 122. Windings 121a and 121b are electrically connected in series to constitute the coil of reactor L1. Winding 122 constitutes the coil of reactor L2.

Core 150 made of a magnetic material is formed to have leg portions 151, 152 and 153. Gaps 161 to 163 are provided in leg portions 151 to 153, respectively. As described above, gaps 161 to 163 are useful for adjusting the inductance value.

Figure 6:
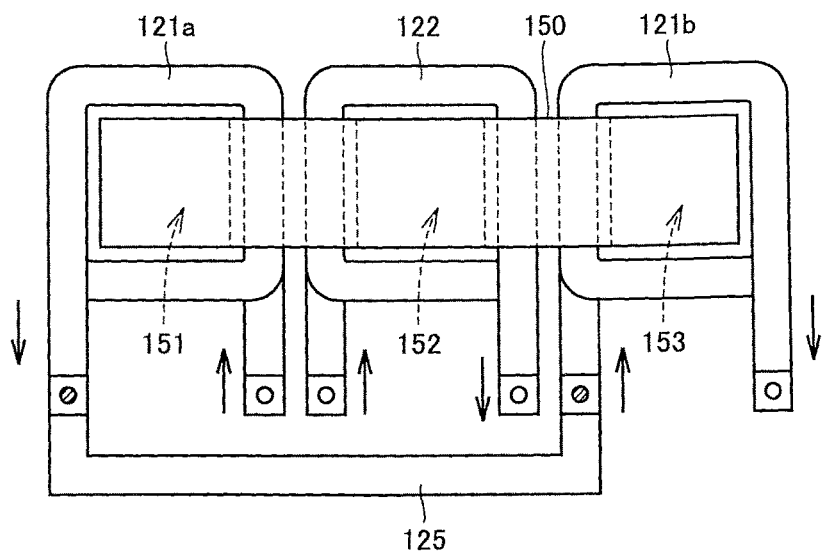
FIG. 6 is a top view for illustrating the configuration of the magnetic component in accordance with an embodiment of the present invention.

FIG. 6 is a top view of magnetic component 100 shown in FIG. 5. The arrangement relationship and the connection relationship among the windings are shown in FIG. 6.

Referring to FIG. 6, winding 121a is wound on leg portion 151 of core 150, and winding 121b is wound on leg portion 152 of core 150.

Windings 121a and 121b are electrically connected in series by a conducting wire 125 to form the coil of reactor L1. Winding 121a and 121b connected in series are wound to have winding directions opposite to each other. Winding 122 is wound on leg portion 153 of core 150 to form the coil of reactor L2.

In this way, in magnetic component 100, winding 121a corresponds to the "first winding", winding 121b corresponds to the "second winding", and winding 122 corresponds to the "third winding." Leg portion 151 corresponds to the "first section", leg portion 153 corresponds to the "second section", and leg portion 152 corresponds to the "third section."

Figure 7:
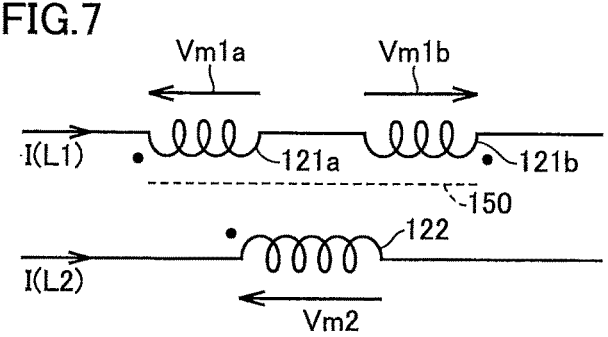
FIG. 7 is an equivalent circuit diagram of the magnetic component in accordance with an embodiment of the present invention.

FIG. 7 is an equivalent circuit diagram of magnetic component 100.

Referring to FIG. 7, common current I(L1) flows through windings 121a and 121b of reactor L1. When current I(L2) flows through winding 122 of reactor L2, an induced voltage Vm1a and an induced voltage Vm1b are produced in windings 121a and 121b, respectively. Since windings 121a and 121b are wound in opposite winding directions, induced voltages Vm1a and Vm1b have opposite polarities and counteract each other. An induced voltage produced in winding 122 when current I(L1) flows through reactor L1 is denoted by Vm2.

Figure 8:
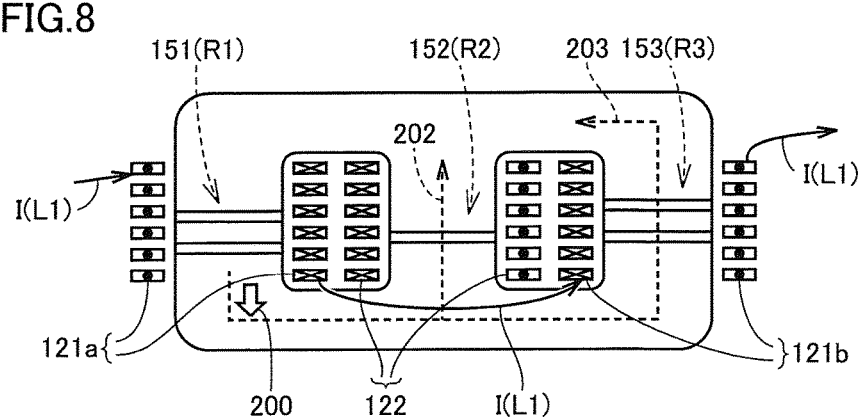
FIG. 8 is a first conceptual view for illustrating magnetic behavior when current flows through a first reactor.
Figure 9:
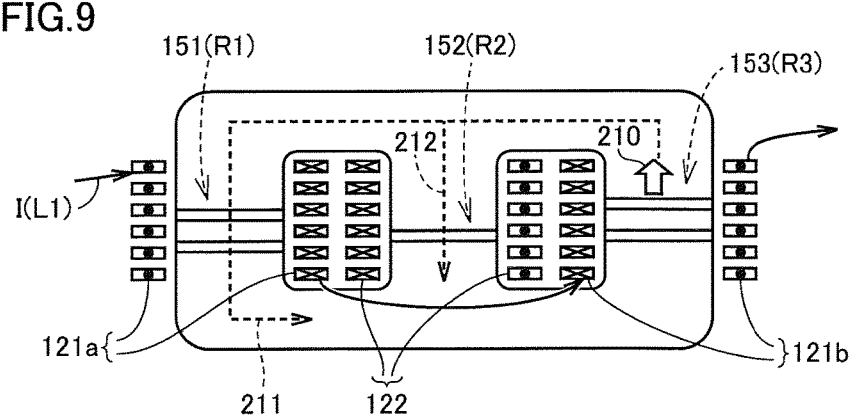
FIG. 9 is a second conceptual view for illustrating magnetic behavior when current flows through the first reactor.

Magnetic behaviors when current I(L1) flows through reactor L1 will be described with reference to FIGS. 8 and 9. FIG. 8 shows a magnetic flux produced by the current flowing through winding 121a. FIG. 9 shows a magnetic flux produced by the current flowing through winding 121b.

Referring to FIG. 8, when current I(L1) flows through winding 121a, a magnetic flux 200 is produced by a magnetomotive force in accordance with the product of current I(L1) and the number of turns of winding 121a.

Magnetic flux 200 is divided into a magnetic path 203 flowing through leg portion 153 and a magnetic path 202 including leg portion 152. In accordance with the ratio of a magnetic resistance R2 of magnetic path 202 to a magnetic resistance R3 of magnetic path 203, the ratio of the magnetic flux flowing through magnetic path 202 to the magnetic flux flowing through magnetic path 203 is determined.

Referring to FIG. 9, current I(L1) flows through winding 121b in common with winding 121a. Accordingly, a magnetic flux 210 is produced by the magnetomotive force in accordance with the product of current I(L1) and the number of turns of winding 121*b*.

Magnetic flux 210 is divided into a magnetic path 211 flowing through leg portion 151 and a magnetic path 212 flowing through leg portion 152. In accordance with the ratio of magnetic resistance R1 of magnetic path 211 to magnetic resistance R2 of magnetic path 212, the ratio of the magnetic flux flowing through magnetic path 211 to the magnetic flux flowing through magnetic path 212 is determined.

As is understood from FIGS. 8 and 9, in leg portion 152 where winding 122 is wound, the magnetic fluxes flow through magnetic path 202 (FIG. 8) and magnetic path 212 (FIG. 9) in the directions that counteract each other. This is because windings 121*a* and 121*b* have opposite winding directions.

Therefore, by designing such that the magnetic fluxes flowing through magnetic paths 202 and 212 are equal in strength, the magnetic flux flowing through winding 122 produced by current I(L1) flowing through reactor L1 can be made zero. Accordingly, induced voltage Vm2 produced in reactor L2 by current I(L1) flowing through reactor L1 can be made zero.

Figure 10:
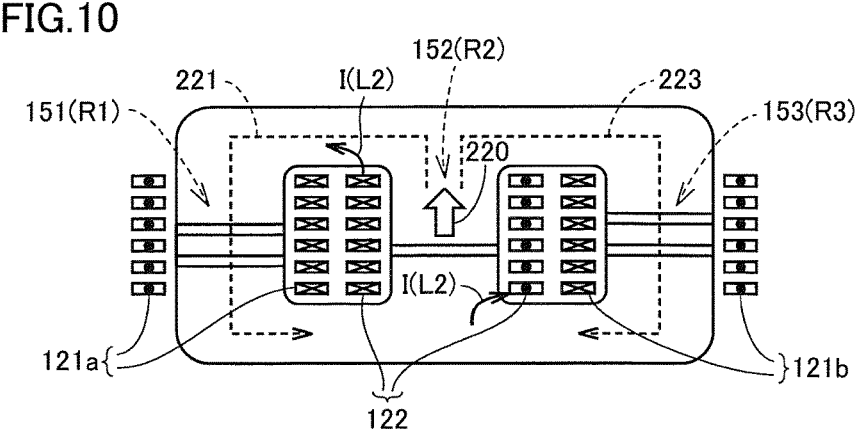
FIG. 10 is a conceptual view for illustrating magnetic behavior when current flows through a second reactor.

The magnetic flux produced by the current flowing through winding 122 is shown in FIG. 10.

Referring to FIG. 10, when current I(L2) flows through winding 122, a magnetic flux 220 is produced by a magnetomotive force in accordance with the product of current I(L2) and the number of turns of winding 122. Magnetic flux 220 is divided into a magnetic path 221 flowing through leg portion 151 and a magnetic path 223 including leg portion 153. In accordance with the ratio of magnetic resistance R1 of magnetic path 221 and magnetic resistance R3 of magnetic path 223, the ratio of the magnetic flux flowing through magnetic path 221 and the magnetic flux flowing through magnetic path 223 is determined.

Therefore, the magnetic fluxes flowing through magnetic paths 221 and 223 become equal by forming leg portions 151 and 153 such that magnetic resistances R1 and R3 are equivalent. At this time, induced voltages Vm1a and Vm1b having opposite polarities produced in windings 121*a* and 121*b*, respectively, become equal in absolute value. As a result, induced voltage Vm1 of reactor L1 as a whole (Vm1=Vm1a+Vm1b) can be made zero.

In this way, in magnetic component 100, reactors L1 and L2 can be formed integrally by windings 121*a*, 121*b* and 122 wound on common core 150. Furthermore, both induced voltage Vm2 produced in reactor L2 by current I(L1) and induced voltage Vm1 produced in reactor L1 by current I(L2) can be made zero. That is, in magnetic component 100, two reactors respectively included in the current paths independently controlled in current can be formed integrally. Accordingly, reduction in size and weight of magnetic component 100 as well as converters 6 and 7 and power supply system 5 including magnetic component 100 can be achieved.

The design of inductance value in magnetic component 100 will now be described.

In magnetic component 100, as described with reference to FIG. 10, it is necessary to design magnetic resistances R1 and R3 equally in order to equalize the magnitude of induced voltages Vm1a and Vm1b of windings 121*a* and 121*b* produced by current I(L2).

Furthermore, the ratio of the inductance value of reactor L1 to the inductance value of reactor L2 can be designed in accordance with the ratio of magnetic resistance R2 of magnetic paths 202, 212 including leg portion 152 to magnetic resistances R1, R3. The ratio of the inductance value of reactor L1 to the inductance value of reactor L2 can be designed since the number of magnetic fluxes can also be adjusted in accordance with the ratio of the number of turns N11 of winding 121*a* (leg portion 151), the number of turns N13 of winding 121*b* (leg portion 153), and the number of turns N12 of winding 122 (leg portion 152). In this way, the inductance value of reactor L1 and the inductance value of reactor L2 can be designed freely in accordance with the magnetic resistances and the turns ratio. It is known that gaps 161 to 163 are useful for adjusting the magnetic resistance of each magnetic path.

For example, if the ratio of magnetic resistances is designed as R1:R2=R3:R2=2:1 and the turns ratio is designed as N11=N12=N13, the coupling factor between windings 121*a*, 121*b* and winding 122 will be 0.33 (⅓), so that the inductance value of L1 can be designed to be twice the inductance value of L2.

Moreover, for each of leg portions 151 to 153, the material of core 150 and the shape and size of leg portions 151 to 153 can be designed such that magnetic saturation does not occur at the time when maximum current I(max) in Equation (4) flows.

Second Embodiment

The second embodiment will describe another exemplary configuration of a power supply system to which magnetic component 100 described in the first embodiment is applied.

Figure 11:
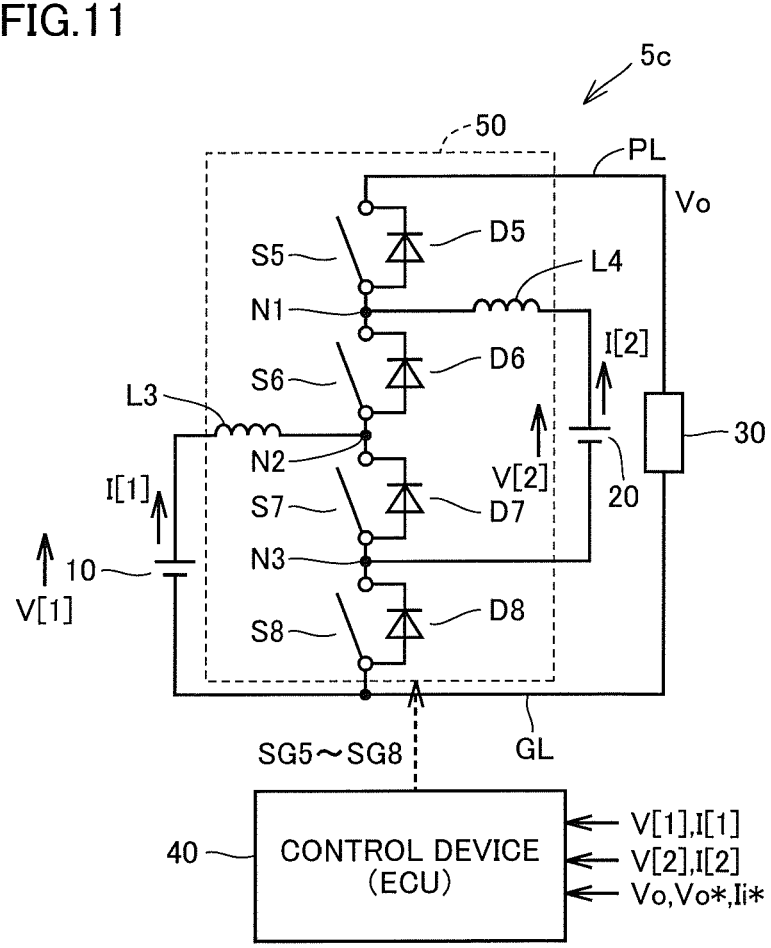
FIG. 11 is a block diagram showing a configuration of a power supply system 5c in accordance with a second embodiment.

FIG. 11 is a block diagram showing a configuration of a power supply system 5*c* in accordance with the second embodiment of the present invention.

Referring to FIG. 11, power supply system 5*c* in accordance with the second embodiment includes DC power sources 10 and 20, a converter 50, and control device 40. As compared with power supply system 5 shown in FIG. 1, power supply system 5*c* in accordance with the second embodiment has a configuration provided with converter 50 instead of converters 6 and 7. Converter 50 is connected between DC power sources 10, 20 and load 30. Converter 50 controls a DC voltage (output voltage Vo) on power line PL connected to load 30 in accordance with a voltage command value.

Converter 50 includes switching elements S5 to S8 and reactors L3, L4. For switching elements S5 to S8, antiparallel diodes D5 to D8 are arranged. Switching elements S5 to S8 are controlled on/off in response to control signals SG5 to SG8 from control device 40.

Switching element S5 is electrically connected between power line PL and a node N1. Reactor L4 is connected between node N1 and a positive terminal of DC power source 20. Switching element S6 is electrically connected between nodes N1 and N2. Reactor L3 is connected between node N2 and a positive terminal of DC power source 10. Switching element S7 is electrically connected between nodes N2 and N3. Switching element S8 is electrically connected between node N3 and ground line GL. Ground line GL is electrically connected to load 30 and a negative terminal of DC power source 10.

As is understood from FIG. 11, converter 50 is configured to include a step-up chopper circuit for each of DC power sources 10 and 20. Specifically, for DC power source 10, a current bidirectional first step-up chopper circuit, having an upper arm element formed by switching elements S5, S6 and a lower arm element formed by switching elements S7, S8, is provided.

Similarly, for DC power source 20, a current bidirectional second step-up chopper circuit, having an upper arm element formed by switching elements S5, S8 and a lower arm element formed by switching elements S6, S7, is provided. Switching elements S5 to S8 are included both in the power conversion path between power source 10 and power line PL formed by the first step-up chopper circuit and the power conversion path between DC power source 20 and power line PL formed by the second step-up chopper circuit.

As will be described in detail below, converter 50 is configured to be switchable between a mode in which DC power sources 10 and 20 are connected in parallel to load 30 to execute DC/DC conversion (hereinafter also referred to as a "parallel connection mode"), and a mode in which DC power sources 10 and 20 are connected in series to load 30 to execute DC/DC conversion (hereinafter also referred to as a "series connection mode"). In particular, converter 50 is capable of operating while switching between the parallel connection mode and the series connection mode by controlling switching elements S5 to S8.

(Circuit Operation in Parallel Connection Mode)

The circuit operation in the parallel connection mode of converter 50 will be described.

As shown in FIGS. 12 and 13, DC power sources 10 and 20 can be connected in parallel with power line PL by turning on switching element S8 or S6. Here, in the parallel connection mode, equivalent circuit will differ depending on which is higher between voltage V[1] of DC power source 10 and voltage V[2] of DC power source 20.

As shown at (a) of FIG. 12, when V[2]>V[1], by turning on switching element S8, DC power sources 10 and 20 are connected in parallel through switching elements S6 and S7. The equivalent circuit at this time is as shown at (b) of FIG. 12.

Referring to (b) of FIG. 12, between DC power source 10 and power line PL, by on/off control of switching element S7, the on-period and the off-period of the lower arm element can be formed alternately. Similarly, between DC power source 20 and power line PL, by common on/off control of switching elements S6 and S7, the on-period and the off-period of the lower arm element of the step-up chopper circuit can be formed alternately. Switching element S5 operates as a switch for controlling regeneration from load 30.

On the other hand, as shown at (a) of FIG. 13, when V[1]>V[2], by turning on switching element S6, DC power sources 10 and 20 are connected in parallel through switching elements S7 and S8. The equivalent circuit at this time is as shown at (b) of FIG. 13.

Referring to (b) of FIG. 13, between DC power source 20 and power line PL, by on/off control of switching element S7, the on-period and the off-period of the lower arm element can be formed alternately. Similarly, between DC power source 10 and power line PL, by common on/off control of switching elements S7 and S8, the on-period and the off-period of the lower arm element of the step-up chopper circuit can be formed alternately. Switching element S5 operates as a switch for controlling regeneration from load 30.

Next, referring to FIGS. 14 and 15, the voltage boosting (step-up) operation of converter 50 in the parallel connection mode will be described.

FIG. 14 shows DC/DC conversion (step-up operation) for DC power source 10 in the parallel connection mode.

Referring to (a) of FIG. 14, by turning on a pair of switching elements S7 and S8 and by turning off a pair of switching elements S5 and S6, a current path 250 for storing energy in reactor L3 is formed. Thus, a state in which the lower arm element of the step-up chopper circuit is on is realized.

In contrast, referring to (b) of FIG. 14, by turning off the pair of switching elements S7 and S8 and by turning on the pair of switching elements S5 and S6, a current path 251 for outputting the energy stored in reactor L3 with the energy of DC power source 10 is formed. Thus, a state in which the upper arm element of the step-up chopper circuit is on is realized.

By alternately repeating the first period in which the pair of switching elements S7 and S8 is on and at least one of switching elements S5 and S6 is off and the second period in which the pair of switching elements S5 and S6 is on and at least one of switching elements S7 and S8 is off, current path 250 of (a) of FIG. 14 and current path 251 of (b) of FIG. 14 are formed alternately.

As a result, a step-up chopper circuit having the pair of switching elements S5 and S6 as an equivalent of the upper arm element and the pair of switching elements S7 and S8 as an equivalent of the lower arm element is formed for DC power source 10. In the DC/DC converting operation shown in FIG. 14, there is no current circulation path to DC power source 20 and, therefore, DC power sources 10 and 20 do not interfere with each other. Specifically, power input/output to and from DC power sources 10 and 20 can be controlled independently.

In such DC/DC conversion, the relation represented by Equation (5) below holds between voltage V[1] of DC power source 10 and output voltage Vo of power line PL. In Equation (5), Da represents the duty ratio of the first period in which the pair of switching elements S7 and S8 is on.

$$Vo=1/(1-Da)\times V[1] \quad (5)$$

FIG. 15 shows DC/DC conversion (step-up operation) for DC power source 20 in the parallel connection mode.

Referring to (a) of FIG. 15, by turning on a pair of switching elements S6 and S7 and by turning off a pair of switching elements S5 and S8, a current path 260 for storing energy in reactor L4 is formed. Thus, a state in which the lower arm element of the step-up chopper circuit is on is realized.

In contrast, referring to (b) of FIG. 15, by turning off the pair of switching elements S6 and S7 and by turning on the pair of switching elements S5 and S8, a current path 261 for outputting the energy stored in reactor L4 with the energy of DC power source 20 is formed. Thus, a state in which the upper arm element of the step-up chopper circuit is on is realized.

By alternately repeating the first period in which the pair of switching elements S6 and S7 is on and at least one of switching elements S5 and S8 is off and the second period in which the pair of switching elements S5 and S8 is on and at least one of switching elements S6 and S7 is off, current path 260 of (a) of FIG. 15 and current path 261 of (b) of FIG. 15 are formed alternately.

As a result, a step-up chopper circuit having the pair of switching elements S5 and S8 as an equivalent of the upper arm element and the pair of switching elements S6 and S7 as an equivalent of the lower arm element is formed for DC power source 20. In the DC/DC converting operation shown in FIG. 15, there is no current path including DC power source 10 and, therefore, DC power sources 10 and 20 do not interfere with each other.

In such DC/DC conversion, the relation represented by Equation (6) below holds between voltage V[2] of DC power source 20 and output voltage Vo of power line PL. In Equation (6), Db represents the duty ratio of the first period in which the pair of switching elements S6 and S7 is on.

$$Vo = 1/(1-Db) \times V[2] \quad (6)$$

As described above, the current flowing through reactor L3 and the current flowing through reactor L4 are controlled independently in the parallel connection mode of converter 50. As a result, power input/output to and from DC power sources 10 and 20 can be controlled independently. That is, it is also necessary to form reactors L3 and L4 such that an induced voltage is not produced in one reactor by the current flowing through the other reactor.

(Circuit Operation in Series Connection Mode)

Next, referring to FIGS. 16 and 17, the circuit operation of converter 50 in the series connection mode will be described.

As shown at (a) of FIG. 16, switching element S7 is fixed on, so that DC power sources 10 and 20 can be connected in series to power line PL. The equivalent circuit at this time is as shown at (b) of FIG. 16.

Referring to (b) of FIG. 16, in the series connection mode, between the series-connected DC power sources 10 and 20 and power line PL, by common on/off control of switching elements S6 and S8, the on-period and the off-period of the lower arm element of the step-up chopper circuit can be formed alternately. Switching element S5 is turned on in the off-period of switching elements S6 and S8, thereby operating as a switch for controlling regeneration from load 30. Further, by switching element S7 which is fixed on, a line 15 connecting reactor L3 to switching element S8 is equivalently formed.

Next, referring to FIG. 17, the DC/DC conversion (step-up operation) in the series connection mode will be described.

Referring to (a) of FIG. 17, switching element S7 is fixed on for connecting DC power sources 10 and 20 in series, the pair of switching elements S6 and S8 is turned on and switching element S5 is turned off. As a result, current paths 270 and 271 for storing energy in reactors L3 and L4 are formed. As a result, for the series-connected DC power sources 10 and 20, a state in which the lower arm element of the step-up chopper circuit is on is realized.

Referring to (b) of FIG. 17, while switching element S7 is kept fixed on, the pair of switching elements S6 and S8 is turned off and switching element S5 is turned on, in contrast to (a) of FIG. 17. Thus, a current path 272 is formed. By current path 272, the sum of energy from DC power sources 10 and 20 connected in series and the energy stored in reactors L3 and L4 is output to power line PL. As a result, for the series-connected DC power sources 10 and 20, a state in which the upper arm element of the step-up chopper circuit is on is realized.

With switching element S7 kept fixed on, by alternately repeating the first period in which the pair of switching elements S6 and S8 is on and switching element S5 is off and the second period in which switching element S5 is on and switching elements S6 and S8 are off, current paths 270 and 271 of (a) of FIG. 17 and current path 272 of (b) of FIG. 17 are formed alternately.

In the DC/DC conversion in the series connection mode, the relation represented by Equation (7) below holds among voltage V[1] of DC power source 10, voltage V[2] of DC power source 20 and output voltage Vo of power line PL. In Equation (7), Dc represents the duty ratio of the first period in which the pair of switching elements S6 and S8 is on.

$$Vo = 1/(1-Dc) \times (V[1]+V[2]) \quad (7)$$

It is noted, however, that if V[1] and V[2] are different or if reactors L3 and L4 have different inductances, reactors L3 and L4 come to have different current values at the end of operation shown at (a) of FIG. 17. Therefore, immediately after the transition to the operation shown at (b) of FIG. 17, if the current of reactor L3 is larger, a difference current flows through a current path 273. If the current of reactor L4 is larger, a difference current flows through a current path 274.

As described above, by controlling a plurality of switching elements S5 to S8, converter 50 can use selectively the mode in which two DC power sources (batteries) 10 and 20 are connected in parallel and the mode in which the power sources are connected in series. As a result, it becomes possible to selectively use the parallel connection mode having improved response to load power (supply of electric power to be consumed and reception of generated electric power) and improved manageability of electric power and the series connection mode having higher efficiency and allowing higher usability of stored energy. Therefore, the two DC power sources 10 and 20 can effectively be utilized.

In the parallel connection mode, reactors L3 and L4 as components of converter 50 need to be independently controlled in current. Therefore, by applying magnetic component 100 described in the first embodiment, reactors L3 and L4 can also be formed integrally. That is, for converter 50 according to the second embodiment, reactors L3 and L4 are preferably formed by applying magnetic component 100 according to the present embodiment so as to achieve reduction in size and weight of the device.

Modification of Second Embodiment

As a modification of the second embodiment, a preferable control operation in the parallel connection mode in the case where magnetic component 100 is applied to the power supply system described in the second embodiment will be described. The control operation described below is achieved by hardware processing and/or software processing by control device 40.

Figure 18:
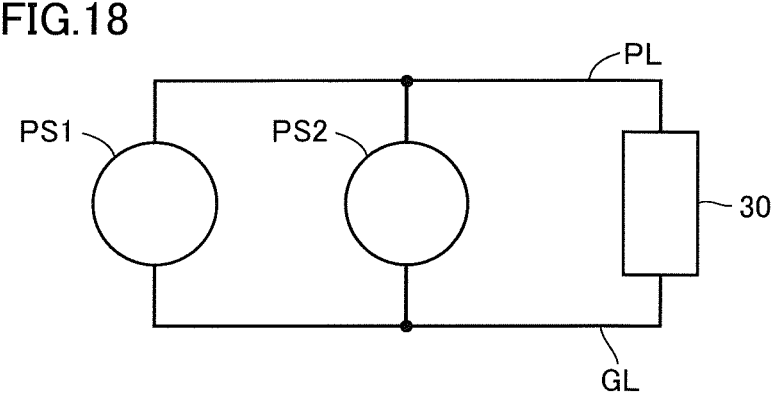
FIG. 18 is a block diagram showing an equivalent circuit viewed from the load side, in the parallel connection mode.

FIG. 18 shows an equivalent circuit viewed from the load side, in the parallel connection mode.

Referring to FIG. 18, in the parallel connection mode, a power source PS1 executing DC/DC conversion between DC power source 10 and load 30 and a power source PS2 executing DC/DC conversion between DC power source 20 and load 30 exchange power with load 30 in parallel. Power source PS1 corresponds to the step-up chopper circuit executing the DC/DC converting operation shown in FIG. 14. Similarly, power source PS2 corresponds to the step-up chopper circuit executing the DC/DC converting operation shown in FIG. 15.

Power source PS1 has the DC/DC converting function with the voltage conversion ratio represented by Equation (5) between voltage V[1] of DC power source 10 and output voltage Vo. Similarly, power source PS2 has the DC/DC converting function with the voltage conversion ratio represented by Equation (6) between voltage V[2] of DC power source 20 and output voltage Vo.

In the parallel connection mode, similarly to converters 6 and 7 (FIG. 1), if common control (voltage control of output voltage Vo) is simultaneously executed for both power sources, power sources PS1 and PS2 come to be connected in parallel on the side of the load and, therefore, there is a possibility of circuit failure. Therefore, one of power sources PS1 and PS2 operates as a voltage source controlling output voltage Vo. The other one of power sources PS1 and PS2 operates as a current source regulating the current of the power source to a current command value.

Therefore, the voltage conversion ratio of each of power sources PS1 and PS2 is controlled such that the power source operates as a voltage source or current source. For example, the power sources are controlled such that power source PS1 operates as a current source and power source PS2 operates as a voltage source like controlling the current in DC power source 10 similarly to the first embodiment.

Figure 19:
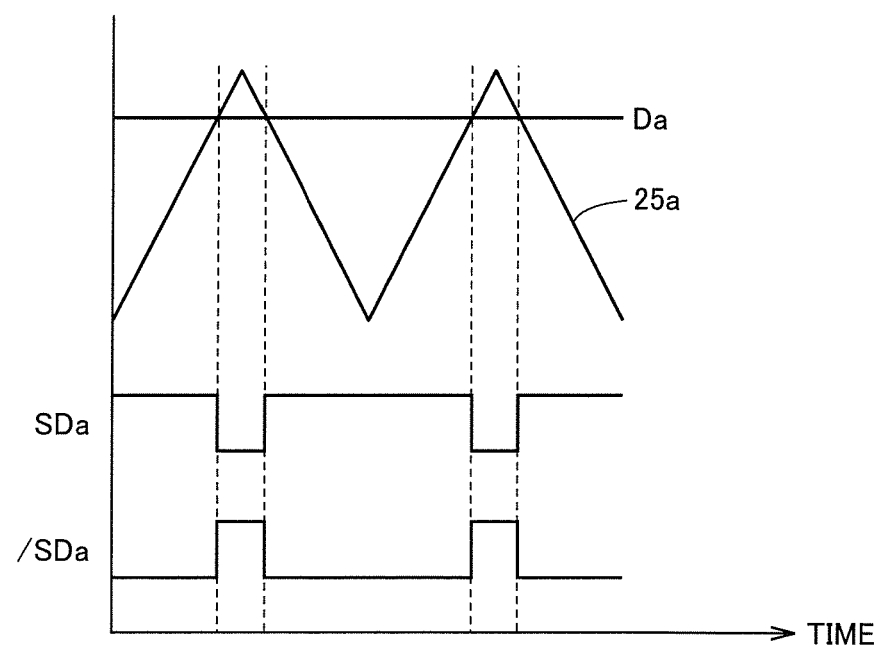
FIG. 19 is a diagram of waveforms representing an exemplary operation for controlling the first power source.

FIG. 19 is a diagram of waveforms representing a specific exemplary operation for controlling power source PS1 corresponding to DC power source 10.

Referring to FIG. 19, a duty ratio Da (see Equation (5)) of power source PS1 is calculated in accordance with current feedback control for the operation as the current source. In FIG. 19, a voltage signal representing duty ratio Da is represented by the same reference character Da.

A control pulse signal SDa of power source PS1 is generated by pulse width modulation (PWM) control based on a comparison between duty ratio Da and a periodical carrier signal 25a. Generally, a triangular wave or a sawtooth wave is used for carrier signal 25a. The period of carrier signal 25a corresponds to the switching frequency of each switching element, and the amplitude of carrier signal 25a is set to a voltage that corresponds to Da=1.0.

Control pulse signal SDa is set to a logic high level (hereinafter denoted by H level) if the voltage indicating duty ratio Da is higher than the voltage of carrier signal 25a, and set to the logic low level (hereinafter denoted by L level) if the voltage is lower than the voltage of carrier signal 25a. The ratio of the H level period to the period of control pulse signal SDa (H level period+L level period), that is, the duty ratio of control pulse signal SDa, is equivalent to Da.

A control pulse signal /SDa is an inversion signal of control pulse signal SDa. When duty ratio Da becomes higher, the duty ratio of control pulse signal SDa becomes higher. When duty ratio Da becomes lower, the duty ratio of control pulse signal SDa becomes lower.

Control pulse signal SDa corresponds to the signal for controlling on/off of the lower arm element of the step-up chopper circuit shown in FIG. 14. Specifically, the lower arm element is turned on in the H level period, and the lower arm element is turned off in the L level period, of control pulse signal SDa. On the other hand, control pulse signal /SDa corresponds to the signal for controlling on/off of the upper arm element of the step-up chopper circuit shown in FIG. 14. The control operation for power source PS1 shown in FIG. 19 corresponds to the control operation by current controller 41 shown in FIG. 2.

FIG. 20 is a diagram of waveforms representing a specific exemplary operation for controlling power source PS2 corresponding to DC power source 20.

Referring to FIG. 20, in power source PS2 also, by the PWM control similar to that for power source PS1, a control pulse signal SDb and its inversion signal /SDb are generated, based on a duty ratio Db (see Equation (6)). The duty ratio of control pulse signal SDb is equivalent to Db, and the duty of control pulse signal /SDb is equivalent to (1.0−Db). Specifically, when duty ratio Db becomes higher, the H level period of control pulse signal SDb becomes longer. On the contrary, when duty ratio Db becomes lower, the L level period of control pulse signal SDb becomes longer.

Control pulse signal SDb corresponds to the signal for controlling on/off of the lower arm element of the step-up chopper circuit shown in FIG. 15. Control pulse signal /SDb corresponds to the signal for controlling on/off of the upper arm element of the step-up chopper circuit shown in FIG. 15.

Duty ratio Db is calculated in accordance with voltage feedback control for power source PS2 to operate as a voltage source. The control operation for power source PS2 shown in FIG. 20 corresponds to the control operation by voltage controller 42 of FIG. 2.

FIG. 21 shows settings of control signals for the respective switching elements in the parallel connection mode.

Referring to FIG. 21, control signals SG5 to SG8 for controlling on/off of switching elements S5 to S8, respectively, are set based on the control pulse signals (SGa, /SGa) for current control for power source PS 1 and the control signal pulses (SGb, /SGb) for voltage control for power source PS2. Specifically, control signals SG5 to SG8 are set based on a logical operation between control pulse signals (more specifically, in a mode of obtaining the logical sum).

Switching element S5 forms the upper arm element in each of the step-up chopper circuits shown in FIGS. 14 and 15. Therefore, control signal SG5 controlling on/off of switching element S5 is generated by the logical sum of control pulse signals /SDa and /SDb.

As a result, switching element S5 is on/off controlled such that it realizes the functions of both the upper arm element of the step-up chopper circuit of FIG. 14 for controlling DC power source 10 and the upper arm element of the step-up chopper circuit of FIG. 15 for controlling DC power source 20.

Switching element S6 forms the upper arm element in the step-up chopper circuit of FIG. 14 and forms the lower arm element in the step-up chopper circuit of FIG. 15. Therefore, control signal SG6 controlling on/off of switching element S6 is generated in accordance with the logical sum of control pulse signals /SDa and SDb. As a result, switching element S6 is on/off controlled such that it realizes the functions of both the upper arm element of the step-up chopper circuit of FIG. 14 and the lower arm element of the step-up chopper circuit of FIG. 15.

Similarly, control signal SG7 for switching element S7 is generated in accordance with the logical sum of control pulse signals SDa and SDb. Thus, switching element S7 is on/off controlled such that it realizes the functions of both the lower arm element of the step-up chopper circuit of FIG. 14 and the lower arm element of the step-up chopper circuit of FIG. 15.

Further, control signal SG8 for switching element S8 is generated in accordance with the logical sum of control pulse signals SDa and /SDb. Thus, switching element S8 is on/off controlled such that it realizes the functions of both the lower arm element of the step-up chopper circuit of FIG. 14 and the upper arm element of the step-up chopper circuit of FIG. 15.

In the parallel connection mode, control signals SG6 and SG8 are set to complementary levels and, therefore, switching elements S6 and S8 are turned on/off in complementary manner. Accordingly, the operation when V[2]>V[1] shown in FIG. 12 and the operation when V[1]>V[2] shown in FIG. 13 are switched naturally. Further, in each operation, switching elements S5 and S7 are switched complementarily and, therefore, DC/DC conversion in accordance with duty ratios Da and Db can be executed in power sources PS1 and PS2, respectively.

As described above, when operating converter 50 according to the second embodiment in the parallel connection mode, PWM control is executed in parallel for each of DC power source 10 and DC power source 20. The phase of carrier signals used for PWM control for DC power source 10 and DC power source 20 will now be described.

Figure 22:
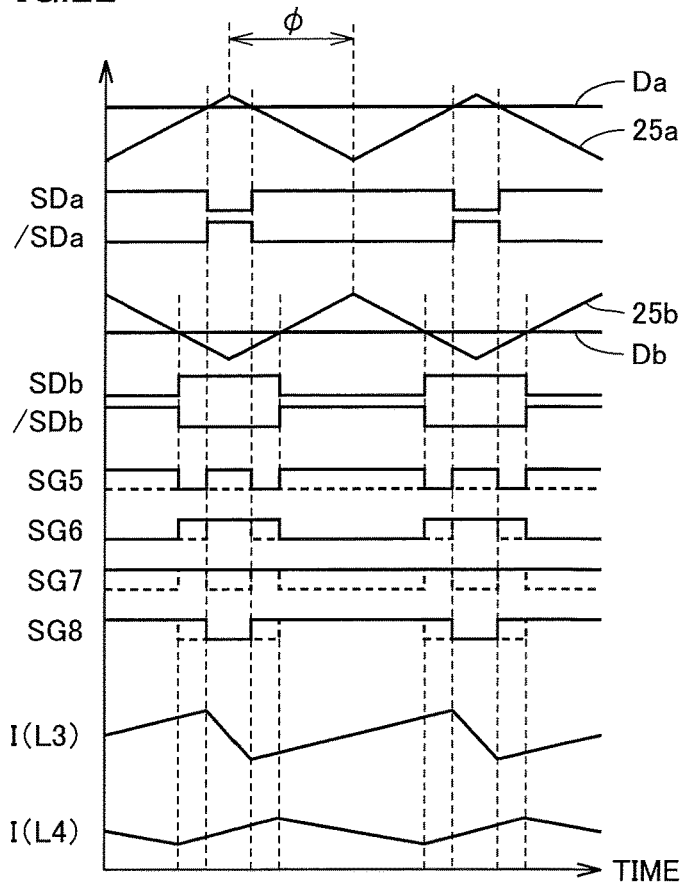
FIG. 22 is a diagram of waveforms representing PWM control in the parallel connection mode.

FIG. 22 shows a diagram of operation waveforms representing PWM control in the parallel connection mode.

Referring to FIG. 22, carrier signal 25a used for PWM control for DC power source 10 and carrier signal 25b used for PWM control for DC power source 20 are periodical signals of the same frequency. With control according to the modification of the second embodiment, a phase difference PH between carrier signals 25a and 25b is controlled. In the example of FIG. 22, phase difference PH=180°.

Control pulse signal SDa is generated based on a voltage comparison between duty ratio Da calculated based on the voltage or current of DC power source 10 and carrier signal 25a. Similarly, control pulse signal SDb is obtained based on a comparison between duty ratio Db calculated based on the current or voltage of DC power source 20 and carrier signal 25b. Control pulse signals /SDa and /SDb are inversion signals of control pulse signals SDa and SDb.

Control signals SG5 to SG8 are set based on a logical operation of control pulse signals SDa (/SDa) and SDb (/SDb) in accordance with the logic operation shown in FIG. 21. By turning on/off switching elements S5 to S8 based on control signals SG5 to SG8, current I(L3) flowing through reactor L3 and current I(L4) flowing through reactor L4 are controlled as shown in FIG. 14. Current I(L3) corresponds to current I[1] of DC power source 10, and current I(L4) corresponds to current I[2] of DC power source 20.

From the principle of PWM control, even if phase difference PH is varied, the length of the H level period of each of control pulse signals SDa and SDb does not change. That is, currents I(L3) and I(L4) become equal in average value for the same duty ratios Da and Db, without depending upon phase difference PH. In this way, the outputs of DC power sources 10 and 20 are controlled by duty ratios Da and Db, and there is no influence exerted even if phase difference PH between carrier signals 25a and 25b is varied.

On the other hand, the phase relationship between control pulse signals SDa and SDb changes in accordance with phase difference PH. Therefore, by changing phase difference PH between carrier signals 25a and 25b, the phase relationship (current phase) between current I(L3) and current I(L4) changes.

Figure 23:
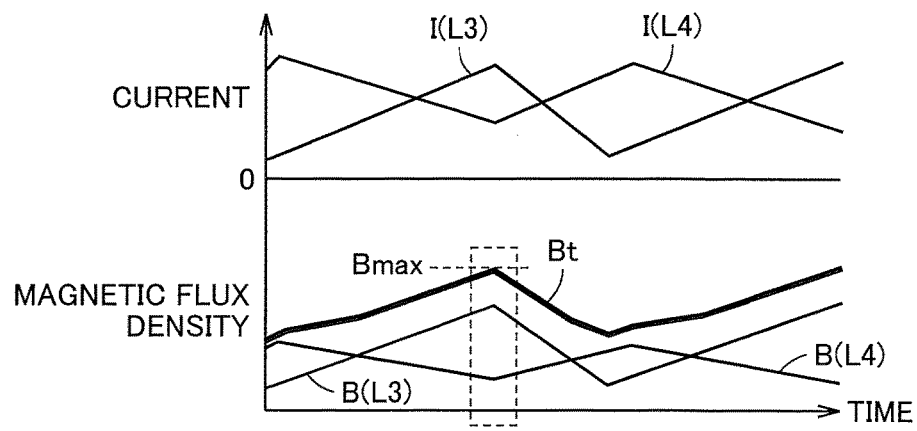
FIG. 23 is a diagram of conceptual waveforms representing relationship between phase of reactor currents and magnetic flux densities.

FIG. 23 shows a diagram of conceptual waveforms representing the relationship between the phase of currents flowing through reactors and magnetic flux densities.

Referring to FIG. 23, currents I(L3) and I(L4) of reactors L3 and L4 change in phase in accordance with phase difference PH between the carrier signals.

A magnetic flux density B(L3) of reactor L3 is proportional to current I(L3), and a magnetic flux density B(L4) of reactor L4 is proportional to current I(L4). A maximum magnetic flux density Bmax as the maximum value of a total magnetic flux density Bt (Bt=B(L3)+B(L4)) flowing through core 150 is proportional to the maximum value of current I(L3)+I(L4).

Therefore, by controlling phase difference PH such that the relative maximum point of current I(L3) and the relative minimum point of current I(L4) agree in phase, the maximum value of current I(L3)+I(L4), that is, maximum magnetic flux density Bmax can be reduced. Alternatively, maximum value Bmax of total magnetic flux density can also be reduced by controlling phase difference PH such that the relative maximum point of current I(L4) and the relative minimum point of current I(L3) agree in phase.

In this way, when forming reactors L3 and L4 with magnetic component 100 applied to converter 50, it is preferable from the viewpoint of controlling the maximum value of magnetic flux density to control phase difference PH such that the relative maximum point of the current flowing through one reactor and the relative minimum point of the current flowing through the other reactor agree in phase.

Also in power supply system 5 in accordance with the first embodiment, each of converters 6 and 7 can be controlled similarly to converter 50 in the parallel connection mode. That is, similarly to the description with reference to FIGS. 18 to 20, 22, and 23, PWM control can be executed independently for each of converters 6 and 7, and the phase difference between the carrier signals used in PWM control for the both converters can be controlled. Therefore, in magnetic component 100 applied to power supply system 5 (FIG. 1), the maximum value of magnetic flux density can be controlled by controlling phase difference PH such that the relative maximum point of one of currents I(L1) and I(L2) and the relative minimum point of the other current agree in phase.

In converter 50 according to the second embodiment, when phase difference PH between carrier signals is controlled so as to reduce the maximum value of magnetic flux density, it will also become possible to reduce losses in switching elements. Its description will be presented below in detail.

First, as a typical example, control in the state where both of DC power sources 10 and 20 are in the power running state, that is, current I(L3)>0 and current I(L4)>0 hold.

Figure 24:
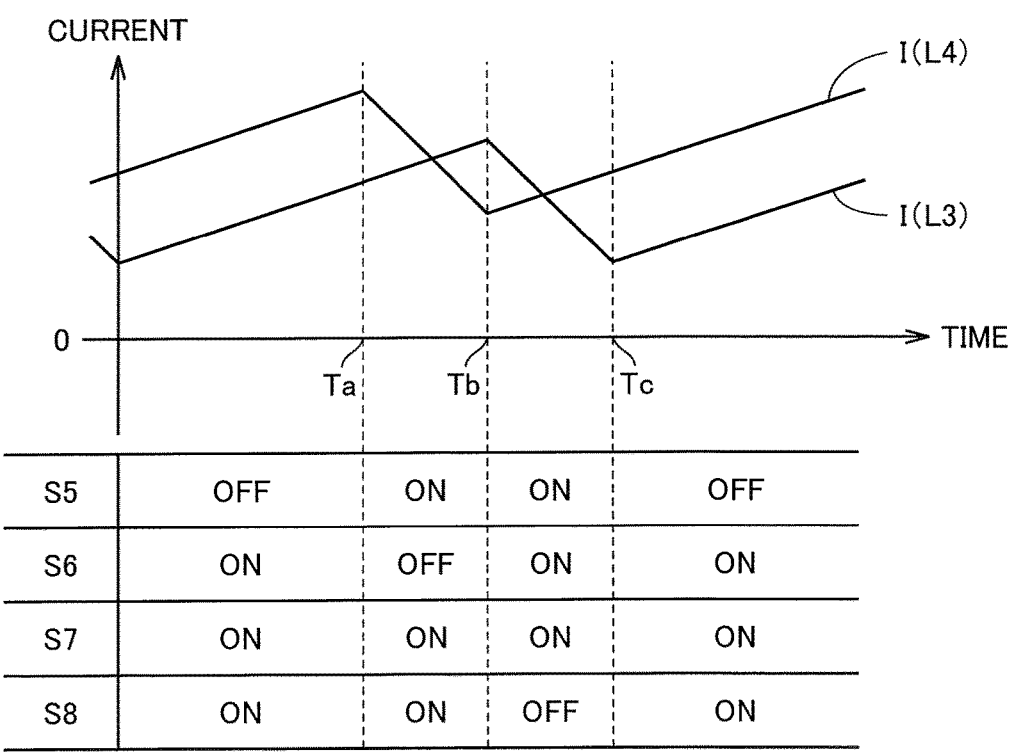
FIG. 24 is a diagram of waveforms representing current phase achieved by carrier phase control for reducing losses in the switching elements in the parallel connection mode.

FIG. 24 is a diagram of waveforms illustrating current phase obtained by phase control according to the first embodiment for reducing losses in the switching elements of converter 50 in the parallel connection mode.

Referring to FIG. 24, since switching elements S6 to S8 are on until time Ta, the lower arm element of the step-up chopper circuit is on for each of DC power sources 10 and 20. Thus, both currents I(L3) and I(L4) increase.

At time Ta, switching element S6 is turned off, so that the lower arm element of the step-up chopper circuit is turned off for DC power source 20. Thus, current I(L4) starts decreasing. Simultaneously with the turn-off of switching element S6, switching element S5 is turned on.

After time Ta, the lower arm element of the step-up chopper circuit is turned on for DC power source 10, and the lower arm element of the step-up chopper circuit is turned off for DC power source 20. That is, current I(L3) increases, while current I(L4) decreases. At this time, the current path in converter 50 will be as shown at (a) of FIG. 25.

As is understood from (a) of FIG. 25, after time Ta, a difference current between currents I(L3) and I(L4) will flow through switching element S8. That is, the current flowing through switching element S8 decreases.

Referring to FIG. 24 again, when switching element S8 is turned off from the state after time Ta, the lower arm element of the step-up chopper circuit is turned off for DC power source 10. Thus, current I(L3) starts decreasing. When switching element S6 is turned on, the lower arm element of the step-up chopper circuit is turned on for DC power source 20. Thus, current I(L4) starts increasing again. That is, the current path in converter 50 changes from the state at (a) of FIG. 25 to the state at (b) of FIG. 25. In the state at (b) of FIG. 25, the difference current between currents I(L3) and I(L4) will flow through switching element S6, which means that the current flowing through switching element S6 decreases.

By turning off switching element S8 in the state at (a) of FIG. 25, the current at the turn-off of switching element S8, that is, a switching loss, can be reduced. By turning off switching element S6 in the state at (b) of FIG. 25, the current at the turn-on of switching element S6, that is, a switching loss, can be reduced.

Here, the current phase, that is, phase difference PH between carrier signals 25a and 25b, is adjusted such that the decrease start timing (relative maximum point) of current I(L3) and the increase timing (relative minimum point) of current I(L4) agree in phase. Accordingly, at time Tb in FIG. 24, switching element S6 is turned on, and switching element S8 is turned off.

Referring to FIG. 24 again, at time Tc, switching element S5 is turned off, and switching element S8 is turned on. Accordingly, for each of DC power sources 10 and 20, a state in which the lower arm element of the step-up chopper circuit is on is realized. Accordingly, the state before time Ta described above is reproduced, and currents I(L3) and I(L4) both increase.

FIG. 26 shows the current waveforms of switching elements S6 and S8 in the current phase shown in FIG. 24. The waveform of current I(S6) of switching element S6 is shown at (a) of FIG. 26, and the waveform of current I(S8) of switching element S8 is shown at (b) of FIG. 26.

Referring to (a) of FIG. 26, current I(S6) is represented as I(S6)=I(L4) in the period before time Ta and the period after time Tc. Since switching element S6 is off in the period from time Ta to Tb, I(S6)=0 holds. In the period from time Tb to Tc, I(S6)=−(I(L3)−I(L4)) holds as shown at (b) of FIG. 25.

Referring to (b) of FIG. 26, current I(S8) is represented as I(S8)=I(L3) in the period before time Ta and the period after time Tc. In the period from time Ta to Tb, as shown at (a) of FIG. 25, I(S8)=−(I(L4)−I(L3)) holds. Switching element S8 is off in the period from time Tb to Tc, and therefore, I(S8)=0 holds.

Figure 27:
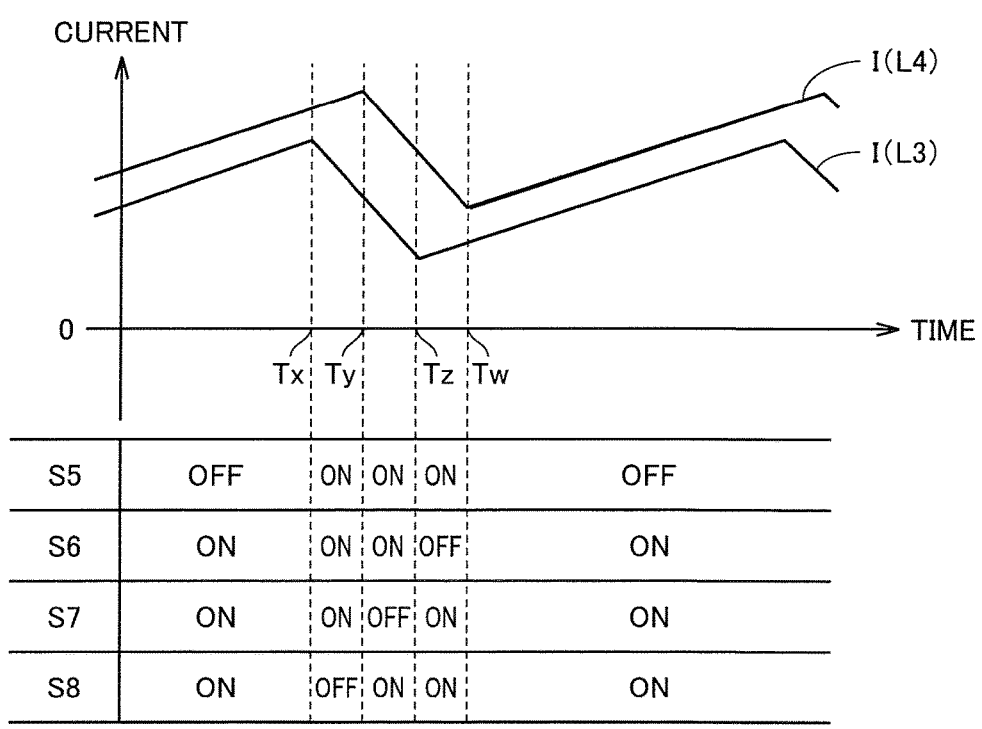
FIG. 27 is a diagram of waveforms showing current phase when phase difference between carrier signals is 0.

FIG. 27 shows a current phase when phase difference PH between carrier signals is set at 0 with a duty ratio equivalent to FIG. 24 for a comparison with FIG. 24.

Referring to FIG. 27, when phase difference PH between carrier signals 25a and 25b is 0, currents I(L3) and I(L4) will increase/decrease at different timings (Tx, Ty, Tz, Tw), respectively.

Specifically, in the state before time Tx where switching element S5 is off and switching elements S6 to S8 are on, current I(L3) and I(L4) both increase. By turning off switching element S8 at time Tx, current I(L3) starts decreasing. Simultaneously with the turn-off of switching element S8, switching element S5 is turned on.

At time Ty, by turning off switching element S7, current I(L4) starts decreasing. Simultaneously with the turn-off of switching element S7, switching element S8 is turned on. Accordingly, current I(L3) and I(L4) both decrease.

At time Tz, switching element S6 is turned off, and switching element S7 is turned on. Accordingly, for DC power source 10, a state in which the lower arm element of the step-up chopper circuit is on is realized. Thus, current I(3) increases again. Furthermore, at time Tw, switching element S5 is turned off, and switching element S6 is turned on. Accordingly, the state before time Tx is reproduced, and current I(L3) and I(L4) both increase.

FIG. 28 shows the current waveforms of switching elements S6 and S8 in the current phase shown in FIG. 27. The waveform of current I(S6) of switching element S6 is shown at (a) of FIG. 28, and the waveform of current I(S8) of switching element S8 is shown at (b) of FIG. 28.

Referring to (a) of FIG. 28, current I(S6) is represented as I(S6)=I(L4) in the period before time Tx and the period after time Tw. In the period from time Tx to Ty, a current path similar to that of (b) of FIG. 25 is formed. Thus, I(S6)=−(I(L3)−I(L4)) holds. In the period from time Ty to Tz, switching element S6 operates as the upper arm element for DC power source 10. Thus, I(S6)=−I(L3) holds. In the period from time Ty to Tz during which currents I(L3) and I(L4) both decrease, switching element S6 operates as the upper arm element for DC power source 10. Thus, I(S6)=−I(L3) holds. In the period from time Tz to Tw, switching element S6 is off. Thus, I(S6)=0 holds.

Referring to (b) of FIG. 28, current I(S8) is represented as I(S8)=I(L3) in the period before time Tx and the period after time Tw. In the period from time Tx to Ty, switching element S8 is off. Thus, I(S8)=0 holds. In the period from time Ty to Tz during which currents I(L3) and I(L4) both decrease, switching element S8 operates as the upper arm element for DC power source 20. Thus, I(S8)=−I(L4) holds. From time Tz to Tw, a current path similar to that of (a) of FIG. 25 is formed. Thus, I(S6)=−(I(L4)−I(L3)) holds.

From the comparison between current I(S6) generated at time Tb at (a) of FIG. 26 and current I(S6) produced at time Tw at (a) of FIG. 28, it is understood that the turn-on current of switching element S6, that is, the switching loss at the turn-on, is reduced by adjusting phase difference PH so as to achieve the current phase of FIG. 24. Furthermore, from the comparison between current I(S6) from time Tb to Tc at (a) of FIG. 26 and current I(S6) from time Ty to Tz at (a) of FIG. 28, it is understood that the conduction loss in switching element S6 is also reduced.

Similarly, from the comparison between current I(S8) at time Tb at (b) of FIG. 26 and current I(S8) at time Tx at (b) of FIG. 28, it is understood that the turn-off current of switching element S8, that is, the switching loss at the turn-off, is reduced by adjusting phase difference PH so as to achieve the current phase of FIG. 24. Furthermore, from the comparison between current I(S8) from time Ta to Tb at (b) of FIG. 26 and current I(S8) from time Ty to Tz at (a) of FIG. 28, it is understood that the conduction loss in switching element S8 is also reduced.

In this way, by providing phase difference PH between carrier signals 25a and 25b, losses in switching elements S5 to S8 can be reduced. As shown in FIG. 24, in the state where DC power sources 10 and 20 are both in the power running state, phase difference PH is set such that the decrease start timing (relative maximum point) of current I(L3) and the increase timing (relative minimum point) of current I(L4) agree in phase, that is, such that the turn-on timing of switching element S6 coincides with the turn-off timing of switching element S8. Losses in switching elements S5 to S8 can thereby be reduced. As a result, the DC power conversion between DC power sources 10, 20 and power line PL (load 30) can be executed efficiently. With such phase difference PH, the fall timing (or rise timing) of control pulse signal SDa and the rise timing (or fall timing) of control pulse signal SDb will coincide.

Control pulse signals SDa and SDb change in accordance with duty ratios Da and Db. Therefore, it can be understood that phase difference PH that can achieve the current phase as shown in FIG. 24 also changes in accordance with duty ratios Da and Db. Therefore, it is possible to previously obtain the relationship between duty ratios Da, Db and phase difference PH for reducing losses in the switching elements, and to previously store that correspondence in control device 40 as a map (phase difference map) or a function expression (phase difference calculation expression).

Then, in the PWM control for voltage/current control in DC power sources 10, 20 in the parallel connection mode, phase difference PH for carrier phase control can be calculated based on calculated duty ratios Da and Db and in accordance with the phase difference map or the phase difference calculation expression. Then, carrier signals 25a and 25b are produced such that they have calculated phase difference PH to execute the PWM control. Accordingly, highly efficient DC power conversion with reduced losses in switching elements S5 to S8 can be achieved.

While the state where both DC power sources 10 and 20 are in the power running state has been described with reference to FIGS. 24 to 28, similar carrier phase control can also be executed in another state.

FIG. 29 is a table for illustrating carrier phase control in accordance with the first embodiment of the present invention in each operation state of the DC power sources.

Referring to FIG. 29, in a state A, both DC power sources 10 and 20 in the power running state as described above. As shown in FIG. 24, phase difference PH between the carrier signals is adjusted so as to achieve a current phase in which the decrease timing (relative maximum point) of current I(L3) and the increase timing (relative minimum point) of current I(L4) coincide at Tb in the drawing. Accordingly, the turn-on loss in switching element S6 and the turn-off loss in switching element S8 at Tb can be reduced. Furthermore, as described above, the conduction loss in switching element S8 in the period from Ta to Tb and the conduction loss in switching element S6 in the period from Tb to Tc can be reduced.

In a state B, both DC power sources 10 and 20 are in the regenerating state. In this state, phase difference PH between the carrier signals is adjusted so as to achieve a current phase in which the increase timing (relative minimum point) of current I(L3) and the decrease timing (relative maximum point) of current I(L4) coincide at Tb in the drawing. Accordingly, the turn-on loss in switching element S8 and the turn-off loss in switching element S6 at Tb can be reduced. Furthermore, as described above, the conduction loss in switching element S6 in the period from Ta to Tb and the conduction loss in switching element S8 in the period from Tb to Tc can be reduced.

In a state C, DC power source 10 is in the regenerating state, while DC power source 20 is in the power running state. In this state, phase difference PH between the carrier signals is adjusted so as to achieve a current phase in which the decrease timing of current I(L3) and the decrease timing of current I(L4) coincide at Ta in the drawing. Accordingly, the turn-on loss in switching element S7 and the turn-off loss in switching element S5 at Ta can be reduced. Furthermore, as described above, the conduction loss in switching element S5 in the period from Ta to Tb and the conduction loss in switching element S7 in the period from Tc to Ta can be reduced.

In a state D, DC power source 10 is in the power running state, while DC power source 20 is in the regenerating state. In this state, phase difference PH between the carrier signals is adjusted so as to achieve a current phase in which the increase timing of current I(L3) and the increase timing of current I(L4) coincide at Tc in the drawing. Accordingly, the turn-on loss in switching element S5 and the turn-off loss in switching element S7 at Tc can be reduced. Furthermore, as described above, the conduction loss in switching element S5 in the period from Tb to Tc and the conduction loss in switching element S7 in the period from Tc to Ta can be reduced.

In this way, in each of states A to D, by setting phase difference PH between the carrier signals such that any critical point (i.e., relative maximum or minimum point) of one of currents I(L3) and I(L4) coincides (i.e., agrees in phase) with any critical point of the other current, losses in switching elements S5 to S8 can be reduced. Furthermore, it is understood that phase difference PH for reducing losses in switching elements S5 to S8 differs depending on the combination of power running/regenerating states of DC power sources 10 and 20. Therefore, in the parallel connection mode of converter 50, it is preferable to set the phase difference map or phase difference calculation expression described above for each combination of power running/regenerating states (states A to D in FIG. 29).

In this way, in control of converter 50 according to the modification of the present second embodiment, phase difference PH between carrier signals 25a and 25b is controlled in accordance with the operating state of converter 50, specifically, the duty ratio for current/voltage control for DC power sources 10 and 20 or the duty ratio and the power running/regenerating states of DC power sources 10 and 20.

In particular, in states A and B where both DC power sources 10 and 20 are in the power running or regenerating state, phase difference PH is controlled such that the current phase shown in FIG. 29 is achieved in accordance with the above-described phase difference map or phase difference calculation expression, so that the relative maximum point of one of currents I(L3) and I(L4) and the relative minimum point of the other current agree in phase. As described above, with such phase difference PH, the fall timing (or rise timing) of control pulse signal SDa and the rise timing (or fall timing) of control pulse signal SDb will coincide. Accordingly, in addition to reduction in losses depending on switching, maximum magnetic flux density Bmax of magnetic component 100 in which reactors L3 and L4 are formed integrally can be reduced. The cross sectional area of the core can thereby be made smaller, so that further reduction in size and weight can be achieved.

As described above, the exemplary configurations of the converter (power converter) and the power supply system, including two reactors, to which magnetic component 100 according to the present embodiment is applied has been described by way of example in the first and second embodiments. However, application of the present invention is not limited to these power converter and power supply system. That is, the magnetic component according to the present embodiment is applicable to any circuit configuration that includes two reactors respectively included in current paths independently controlled in current. Accordingly, reduction in size and weight of the device can be achieved by forming the two reactors included in the power converter and the power supply system integrally.

Further, it is noted that load 30 may be configured by any device that operates with controlled DC voltage Vo. Specifically, though examples in which load 30 is a traction motor or an inverter mounted on an electric vehicle or a hybrid vehicle have been described in the embodiments, application of the present invention is not limited to such examples.

It should be understood that the embodiments disclosed herein are illustrative and non-restrictive in every respect. The scope of the present invention is defined by the claims not by the description above, and is intended to include any modification within the meaning and scope equivalent to the terms of the claims.

INDUSTRIAL APPLICABILITY

The present invention is applicable to a magnetic component with two reactors included in different current paths as well as a power converter and a power supply system including the magnetic component.

The invention claimed is:

1. A power converter comprising:
   first and second reactors configured by a magnetic component electrically connected between a DC power source and a load;
   a plurality of switching elements arranged between said DC power source and said load such that a first current flowing through said first reactor and a second current flowing through said second reactor are controlled independently; and
   a control device configured to control on/off of said plurality of switching elements so as to control an output voltage on a power line connected to said load,
   said magnetic component including:
      first and second windings connected in series and forming said first reactor; and
      a third winding forming second reactor; and
      a core configured to include a first section on which said first winding is wound, a second section on which said second winding is wound, and a third section on which said third winding is wound,
   said first to third windings being wound on said first to third sections, respectively, such that, in a state where magnetic saturation does not occur in said core, a magnetic flux produced from said first winding and flowing through said third winding and a magnetic flux produced from said second winding and flowing through said third winding counteract each other, when said first current flows through said first and second windings, and induced voltages produced in said first and second windings, respectively, by a magnetic flux produced from said third winding counteract each other, when said second current flows through said third winding, and
   said control device controlling a phase difference between a first carrier signal used for first pulse width modulation control for controlling power conversion in a first power conversion path through which said first current flows and a second carrier signal used for second pulse width modulation control for controlling power conversion in a second power conversion path through which said second current flows such that any critical point of one of said first and second currents coincides with any critical point of the other one of said first and second currents in phase, and then generates signals for controlling on/off of said plurality of switching elements in accordance with said first and second pulse width modulation control.

2. The power converter according to claim 1, wherein
   in said core on which said first to third windings are wound, in a state where magnetic saturation does not occur in said core, a magnetic resistance of a first magnetic circuit passing through said first section and a magnetic resistance of a second magnetic circuit passing through said second section are equivalent, when said second current flows through said third winding, and
   said first and second windings have winding directions opposite to each other.

3. The power converter according to claim 1, wherein
   said control device controls said phase difference between said first carrier signal and said second carrier signal, when both said first and second currents flow in positive or negative direction, such that a relative maximum point of one of said first and second currents and a relative minimum point of the other of said first and second currents agree in phase.

4. A power supply system comprising:
   a first DC power source;
   a second DC power source; and
   the power converter as defined in claim 1,
   said power converter being configured to execute DC power conversion between a power line electrically connected to the load and said first and second DC power sources,
   said plurality of switching elements including:
      a first switching element electrically connected between a first node and said power line;
      a second switching element electrically connected between a second node and said first node;
      a third switching element electrically connected between a third node electrically connected to a negative terminal of said second DC power source and said second node; and
      a fourth switching element electrically connected between a negative terminal of said first DC power source and said third node,
   said first reactor being electrically connected between a positive terminal of said first DC power source and said second node, and
   said second reactor being electrically connected between the positive terminal of said second DC power source and said first node.

5. The power supply system according to claim 4, wherein
   in said core on which said first to third windings are wound, in the state where magnetic saturation does not occur in said core, a magnetic resistance of a first magnetic circuit passing through said first section and a magnetic resistance of a second magnetic circuit passing through said second section are equivalent, when said second current flows through said third winding, and
   said first and second windings have winding directions opposite to each other.

6. The power supply system according to claim 4, wherein said power converter is configured to be switchable, by controlling said plurality of switching elements, between a first operation mode in which said DC power conversion is executed with said first and second DC power sources electrically connected in series with said power line and a second operation mode in which said first and second DC power sources execute said DC power conversion to said power line in parallel.

7. The power supply system according to claim 4, wherein
   said control device controls said phase difference between said first carrier signal and said second carrier signal, when both said first and second DC power sources are in a power running or regenerating state, such that a relative maximum point of one of said first and second currents and a relative minimum point of the other of said first and second currents agree in phases.

8. The power supply system according to claim 4, wherein said phase difference is controlled such that one of a rising edge and a falling edge of a first control pulse signal obtained by said first pulse width modulation control coincides with the other one of a rising edge and a falling edge of a second control pulse signal obtained by said second pulse width modulation control.

* * * * *